US012586605B1

(12) United States Patent
Iben et al.

(10) Patent No.: US 12,586,605 B1
(45) Date of Patent: Mar. 24, 2026

(54) MAGNETIC TAPE HEAD USABLE IN TWO OR MORE MODES OF OPERATION

(71) Applicant: International Business Machines Corporation, Armonk, NY (US)

(72) Inventors: Icko E. T. Iben, Santa Clara, CA (US); David Lee Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/219,902

(22) Filed: May 27, 2025

(51) Int. Cl.
| | |
|---|---|
| *G11B 5/596* | (2006.01) |
| *G11B 5/008* | (2006.01) |
| *G11B 5/584* | (2006.01) |
| *G11B 15/18* | (2006.01) |

(52) U.S. Cl.
CPC .......... G11B 5/584 (2013.01); G11B 5/00813 (2013.01); *G11B 15/18* (2013.01)

(58) Field of Classification Search
CPC ..... G11B 5/48; G11B 21/103; G11B 5/59688; G11B 5/00878; G11B 5/584; G11B 5/583; G11B 5/59655; G11B 5/5504; G11B 5/5513; G11B 5/5508; G11B 5/59633; G11B 5/00813; G11N 5/5965
USPC ................................................. 360/48, 77.12
See application file for complete search history.

(56) References Cited

U.S. PATENT DOCUMENTS

| | | | |
|---|---|---|---|
| 7,681,793 B2 | 3/2010 | Biskeborn et al. | |
| 7,724,465 B2 | 5/2010 | Koeppe | |
| 9,142,224 B2 * | 9/2015 | Hansen | .............. G11B 5/00878 |
| 12,300,284 B1 | 5/2025 | Iben et al. | |
| 2025/0149061 A1 | 5/2025 | Iben et al. | |
| 2025/0149063 A1 | 5/2025 | Iben et al. | |

OTHER PUBLICATIONS

Authors et al.: Disclosed Without Attribution, IP.com No. IPCOM000267051D, "Reader/Writer Tape Head Module Having Multiple Rows of Elements Built on Different Pitch Spacing", Sep. 20, 2021, 4 pages.
Iben, et al., "Tape Head Wafer Design for Multiple Formats Using Same Tape", U.S. Appl. No. 19/001,957, filed Dec. 26, 2024, 56 Pages.

* cited by examiner

*Primary Examiner* — Nabil Z Hindi
(74) *Attorney, Agent, or Firm* — Zilka-Kotab, P.C.

(57) ABSTRACT

An apparatus configured for 32- and 64-channel operation, in accordance with one embodiment, includes a first group of evenly-spaced elements, the first group having a 32 elements including at least a first element, a last element, and a second-to-last element of the first group. A second group of evenly-spaced elements is positioned adjacent the first group and extending along a longitudinal axis of the first group, the second group having 32 elements including at least a first element, a last element, and a second-to-last element of the second group. Also present are a plurality of servos, comprising at least a first, second, third, fourth, fifth, and sixth servo. The elements of the first group are spaced by an element pitch ($W_{EPo}$). The elements of the second group are spaced by the element pitch ($W_{EPo}$). The third and fourth servos are positioned between the first and second groups.

19 Claims, 25 Drawing Sheets

100

$$W_{Tape} = 2 \cdot W_{Edge} + N_{DB} \cdot (W_{DB} + 2 \cdot W_{DBG}) + (N_{DB} + 1) \cdot (W_{SB} + 2 \cdot W_{SBG})$$

FIG. 16

Tilted Head Modifications. 1 Servo Per Servo Band Shown

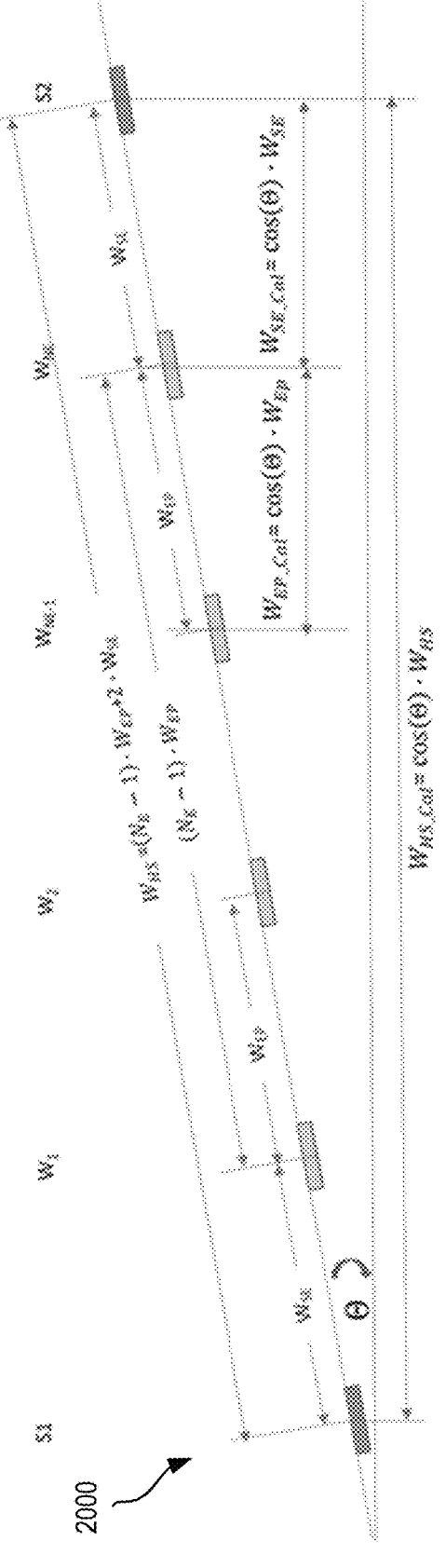

* With Tilted Head rotation angle, $\Theta$, the Head Span, $W_{HS}$, Element Pitch, $W_{EP}$, and Servo-to-Element Separation, $W_{SE}$, all need to increase from their values calculated with a 0-degree rotation angle, $W_{X\_Cal}$.

$$W_{X\_Head} = \frac{W_{X\_Cal}}{\cos(\Theta)}$$

For Pisa angle, calculate in the tape width reference frame

1. Multiply wafer dimensions $W_W$ and $W_S$ by $\cos(\Theta)$
2. Calculate $W_{X\_Cal}$ ( $W_{EP}$, $W_{SB}$, $W_{DB}$, $W_{SEShort}$, $W_{SELong}$) in the tape width reference width
3. Multiply ( $W_{EP}$, $W_{SB}$, $W_{DB}$, $W_{SEShort}$, $W_{SELong}$) by $1/\cos(\Theta)$ to revert to the module width, $W_{X\_Head}$

MAGNETIC TAPE HEAD USABLE IN TWO OR MORE MODES OF OPERATION

BACKGROUND

The present invention relates to data storage systems, and more particularly, this invention relates to magnetic tape heads and tape drive systems.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

An apparatus configured for 32- and 64-channel operation, in accordance with one embodiment, includes a first group of evenly-spaced elements, the first group having a number $(N_E)=32$ of the elements including at least a first element, a last element, and a second-to-last element of the first group. A second group of evenly-spaced elements is positioned adjacent the first group and extending along a longitudinal axis of the first group, the second group having $N_E=32$ of the elements including at least a first element, a last element, and a second-to-last element of the second group. Also present are a plurality of servos, comprising at least a first, second, third, fourth, fifth, and sixth servo. The elements of the first group are spaced by an element pitch $(W_{EPo})$. The elements of the second group are spaced by the element pitch $(W_{EPo})$. The third and fourth servos are positioned between the first and second groups. The first element in the first group and the first servo are separated by a first distance $(W_{SE.Long})$. The second-to-last element in the first group and the fourth servo are separated by the first distance $(W_{SE.Long})$. The first element in the second group and the third servo are separated by the first distance $(W_{SE.Long})$. The second-to-last element in the second group and the sixth servo are separated by the first distance $(W_{SE.Long})$. The first element in the first group and the second servo are separated by a second distance $(W_{SE.Short})$. The second-to-last element in the first group and the third servo are separate by the second distance $(W_{SE.Short})$. The last element in the first group and the fourth servo are separate by the second distance $(W_{SE.Short})$. The first element in the second group and the fourth servo are separated by the second distance $(W_{SE.Short})$. The second-to-last element in the second group and the fifth servo are separate by the second distance $(W_{SE.Short})$. The last element in the second group and the sixth servo are separate by the second distance $(W_{SE.Short})$. The first servo and the third servo are separated by a third distance equal to 2. $W_{SE.Short}+(N_E-1)$. $W_{EP64}$, wherein $W_{EP64}=W_{EPo}$. The second servo and the fourth servo are separated by the third distance. The third servo and the fifth servo are separated by the third distance. The fourth servo and the sixth servo are separated by the third distance.

An apparatus configured for 32-, 64-, and 128-channel operation, in accordance with another embodiment, includes a first group of evenly-spaced elements, the first group having a number $(N_E)=16$ or 32 of the elements including at least a first element, a last element, and a second-to-last element of the first group. A second group of evenly-spaced elements is positioned adjacent the first group and extending along a longitudinal axis of the first group, the second group having $N_E=16$ or 32 of the elements including at least a first element, a last element, and a second-to-last element of the second group. A third group of evenly-spaced elements is positioned adjacent the second group and extending along a longitudinal axis of the first group, the third group having $N_E=16$ or 32 of the elements including at least a first element, a last element, and a second-to-last element of the third group. A fourth group of evenly-spaced elements is positioned adjacent the third group and extending along a longitudinal axis of the first group, the fourth group having $N_E=16$ or 32 of the elements including at least a first element, a last element, and a second-to-last element of the fourth group. The apparatus also includes a plurality of servos, comprising at least a first servo, a second servo, a third servo, a fourth servo, a fifth servo, a sixth servo, a seventh servo, an eighth servo, a ninth servo, and tenth servo. The elements of all groups are spaced by an element pitch $(W_{EPo})$ in the respective group. The third and fourth servos are positioned between the first and second groups. The fifth and sixth servos are positioned between the second and third groups. The seventh and eight servos are positioned between the third and fourth groups. The first element in the first group and the first servo are separated by a first distance $(W_{SE.Long})$. The first element in the second group and the third servo are separated by the first distance $(W_{SE.Long})$. The first element in the third group and the fifth servo are separated by the first distance $(W_{SE.Long})$. The first element in the fourth group and the seventh servo are separated by the first distance $(W_{SE.Long})$. The second-to-last element in the first group and the fourth servo are separated by the first distance $(W_{SE.Long})$. The second-to-last element in the second group and the sixth servo are separated by the first distance $(W_{SE.Long})$. The second-to-last element in the third group and the eighth servo are separated by the first distance $(W_{SE.Long})$. The second-to-last element in the fourth group and the tenth servo are separated by the first distance $(W_{SE.Long})$. The first element in the first group and the second servo are separated by a second distance $(W_{SE.Short})$. The first element in the second group and the fourth servo are separated by the second distance $(W_{SE.Short})$. The first element in the third group and the sixth servo are separated by the second distance $(W_{SE.Short})$. The first element in the fourth group and the eighth servo are separated by the second distance $(W_{SE.Short})$. The second-to-last element in the first group and the third servo are separate by the second distance $(W_{SE.Short})$. The second-to-last element in the second group and the fifth servo are separated by the second distance $(W_{SE.Short})$. The second-to-last element in the third group and the seventh servo are separated by the second distance $(W_{SE.Short})$. The second-to-last element in the fourth group and the ninth servo are separate by the second distance $(W_{SE.Short})$. The first servo and the third servo are separated by a third distance equal to $W_{SE.Short}+(N_E-1)$. $W_{EP64}$, wherein $W_{EP64}=W_{EPo}$. The second servo and the fourth servo are separated by the third distance. The third servo and the fifth servo are separated by the third distance. The fourth servo and the sixth servo are separated by the third distance. The fifth servo and the seventh servo are separated by the third distance. The sixth servo and the eighth servo are separated by the third distance. The seventh servo and the ninth servo are separated by the third distance. The eighth servo and the tenth servo are separated by the third distance.

A magnetic recording tape, in accordance with one embodiment, includes nine evenly spaced servo bands separated by a distance of about 1435.51 μm with servo patterns in the servo bands being rotated by 10 degrees with respect to a track-width orientation and a width of the servo band containing the servo patterns is about 54.84 mm.

Any of these embodiments may be implemented in a magnetic data storage system such as a tape drive apparatus, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

4

Figure 11:
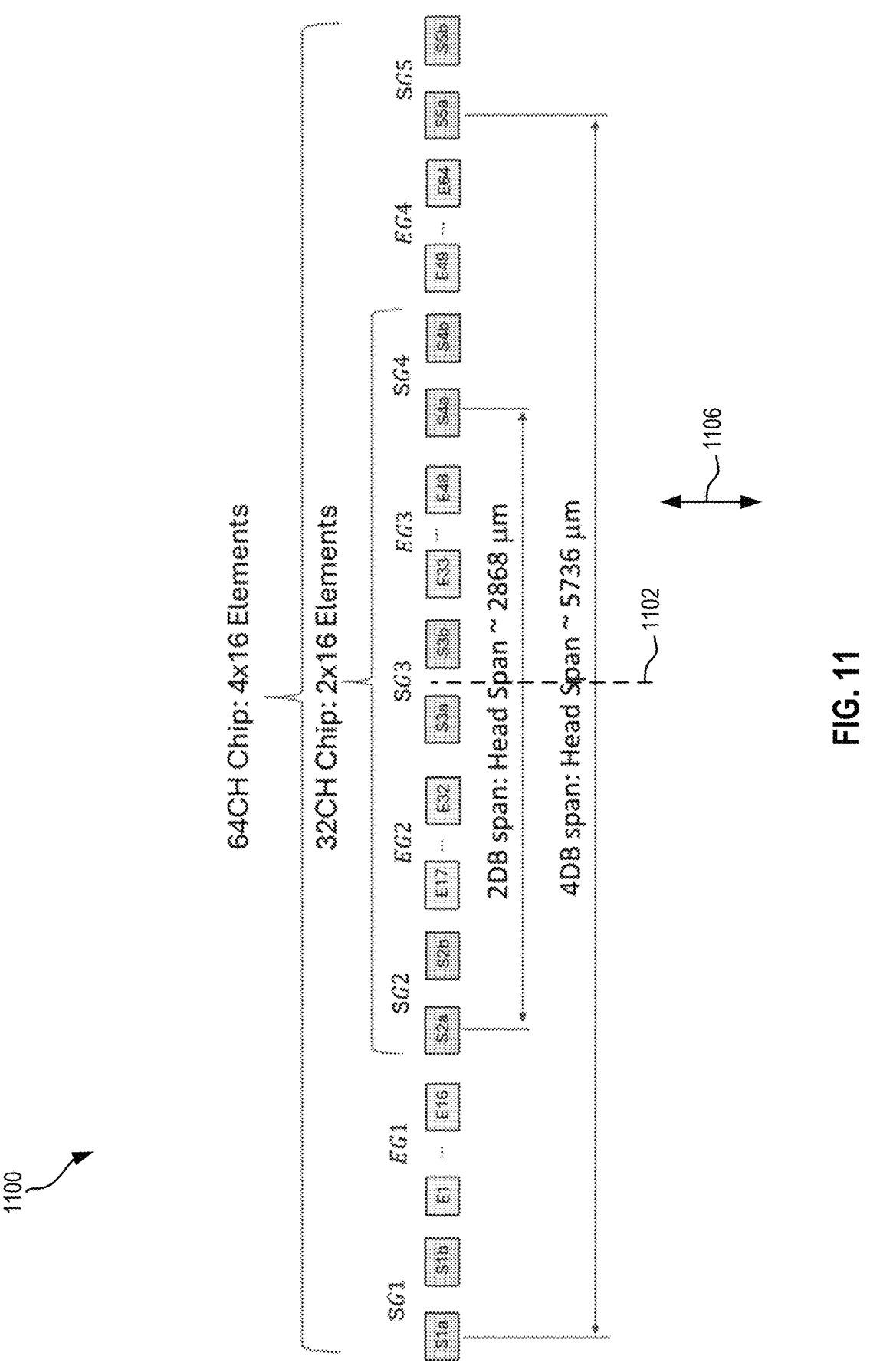

FIG. 11 depicts an apparatus configured for 32- and 64-channel operation, in accordance with one embodiment.

Figure 12:
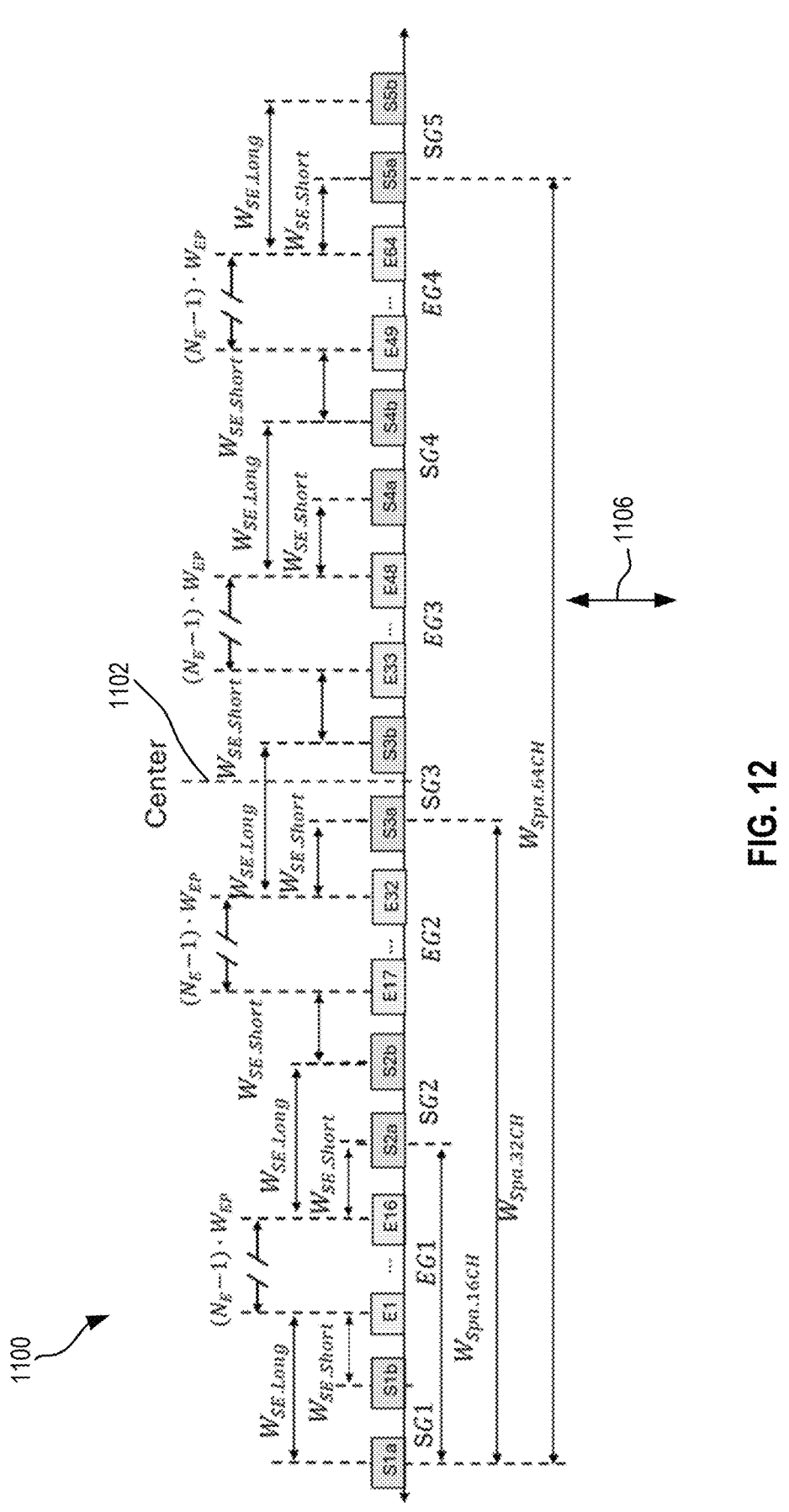

FIG. 12 is a partial representative view of the apparatus of FIG. 11, particularly showing spacing between elements and servos.

Figures 13A, 13B, 13C:
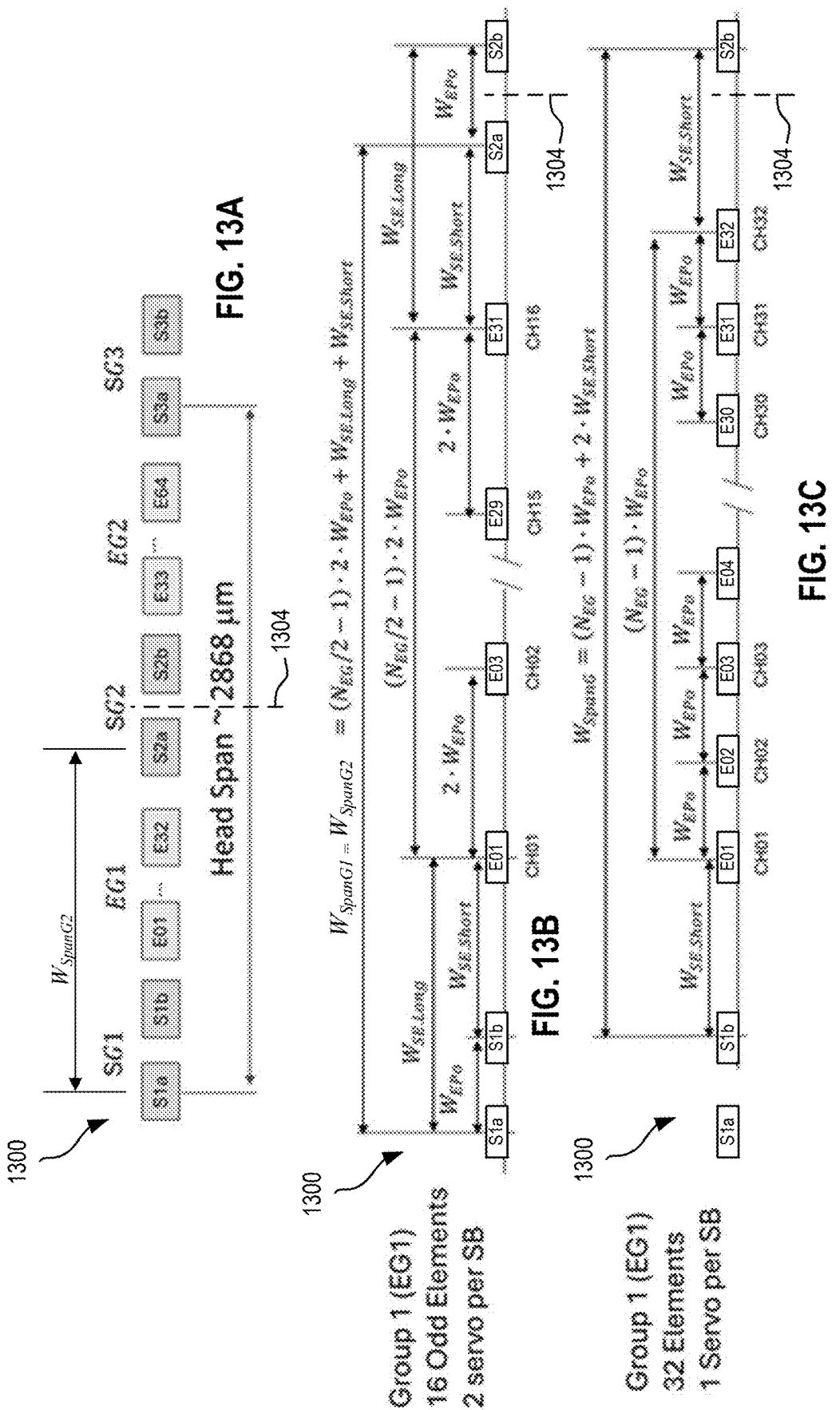

FIGS. 13A-13C depict an apparatus for 32- and 64-channel operation, in accordance with one embodiment.

Figure 14:
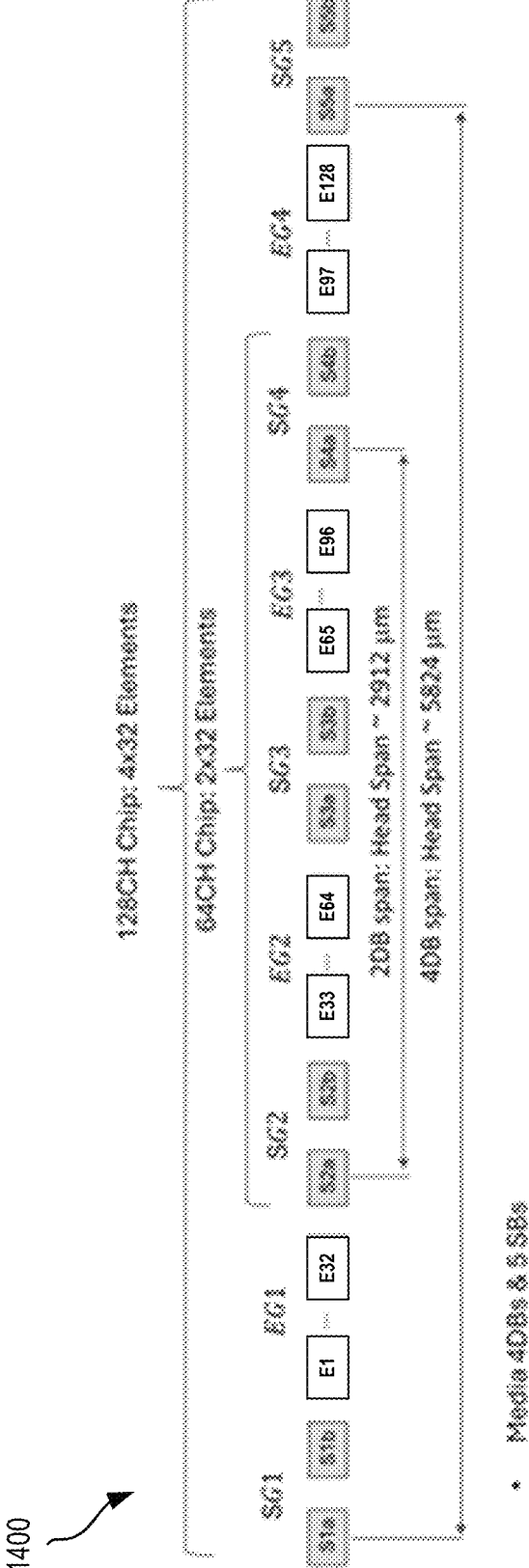

FIG. 14 depicts an apparatus for 32-, 64-, and 128-channel (128CH) operation, in accordance with one embodiment.

Figure 15A:
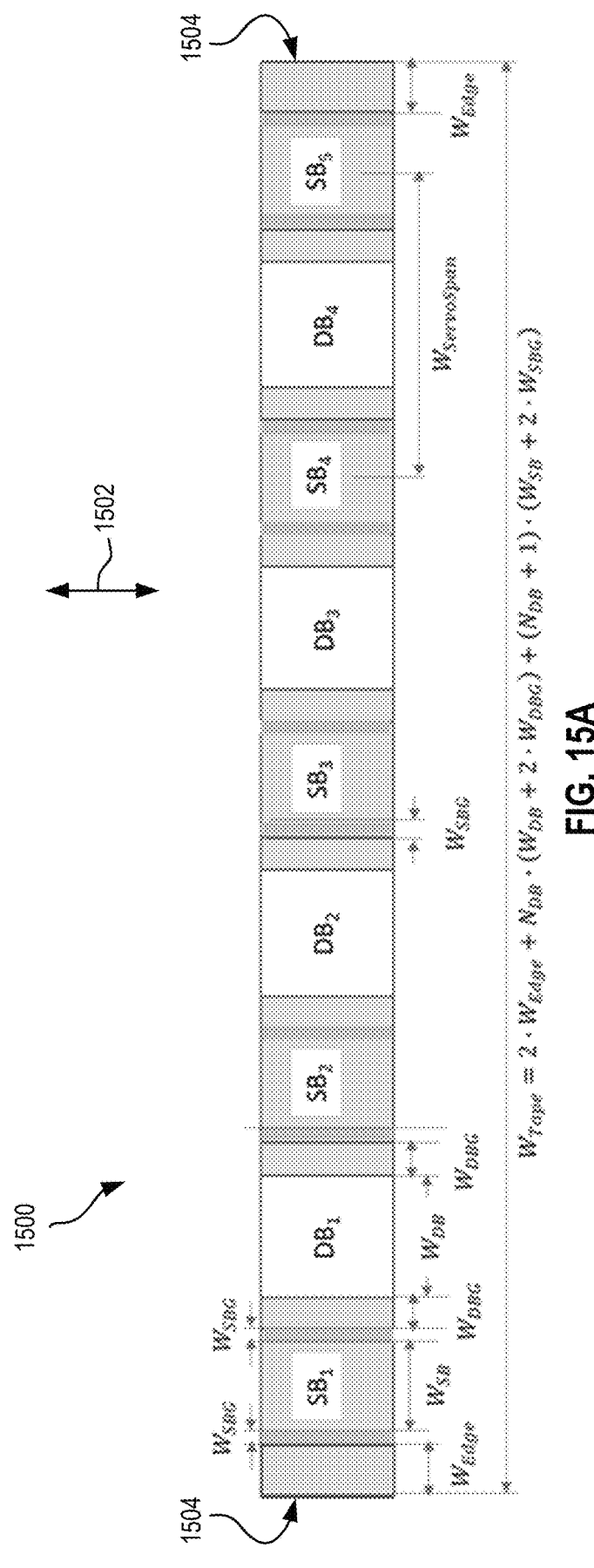

FIG. 15A is a schematic of a tape medium layout using four data bands and five servo bands, in accordance with one embodiment.

Figure 15B:
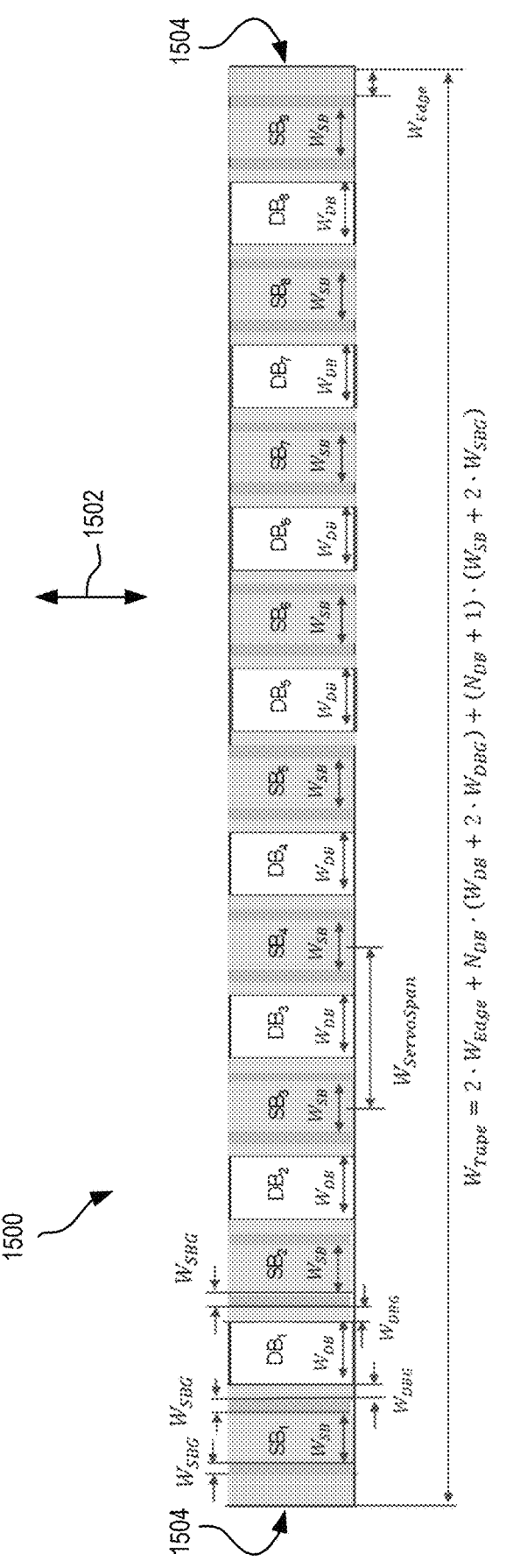

FIG. 15B is a schematic of a tape medium layout using eight data bands and nine servo bands, in accordance with one embodiment.

Figure 16:
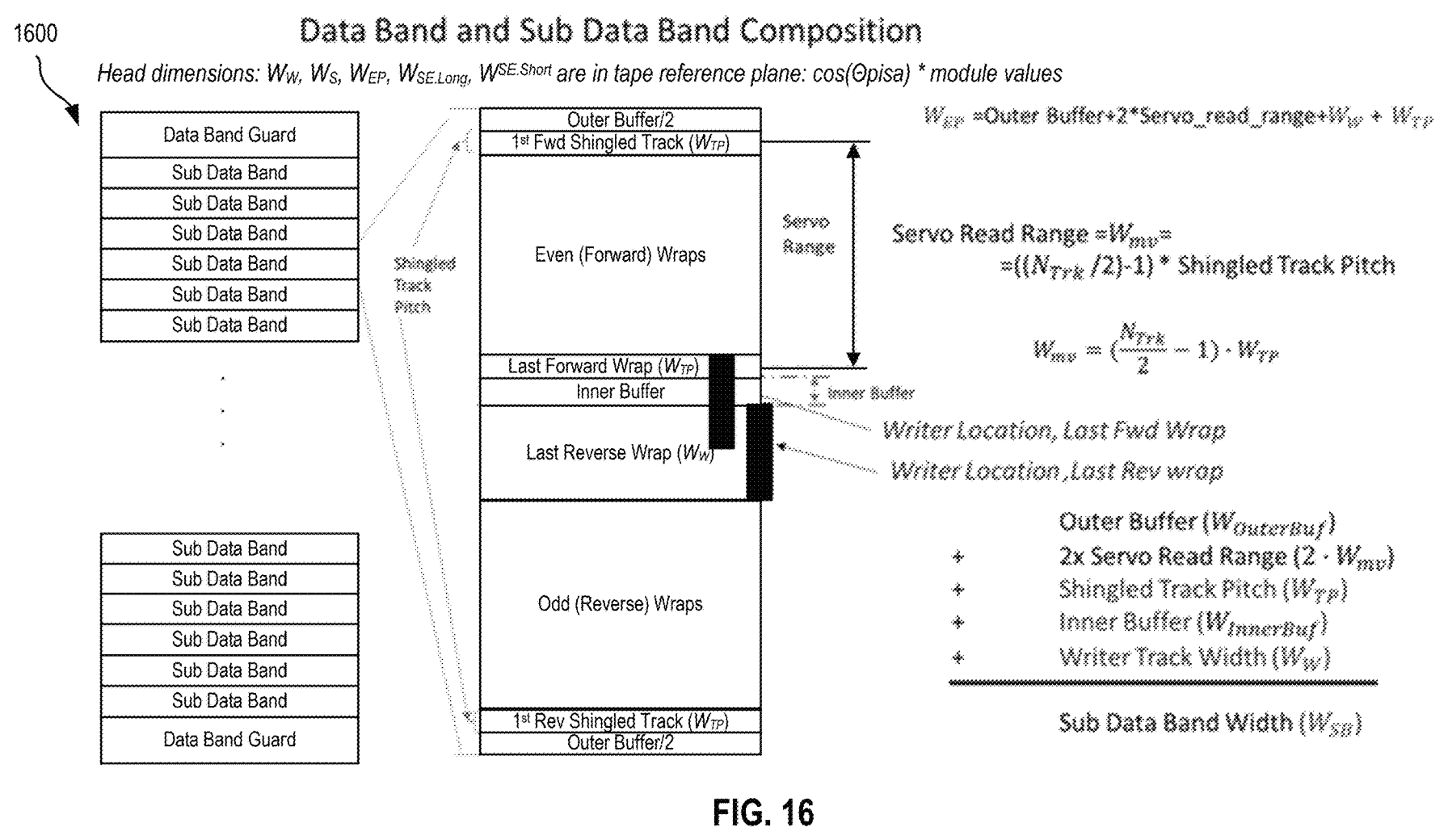

FIG. 16. is a representative schematic of a data band and sub data bands, in accordance with one embodiment.

Figure 17:
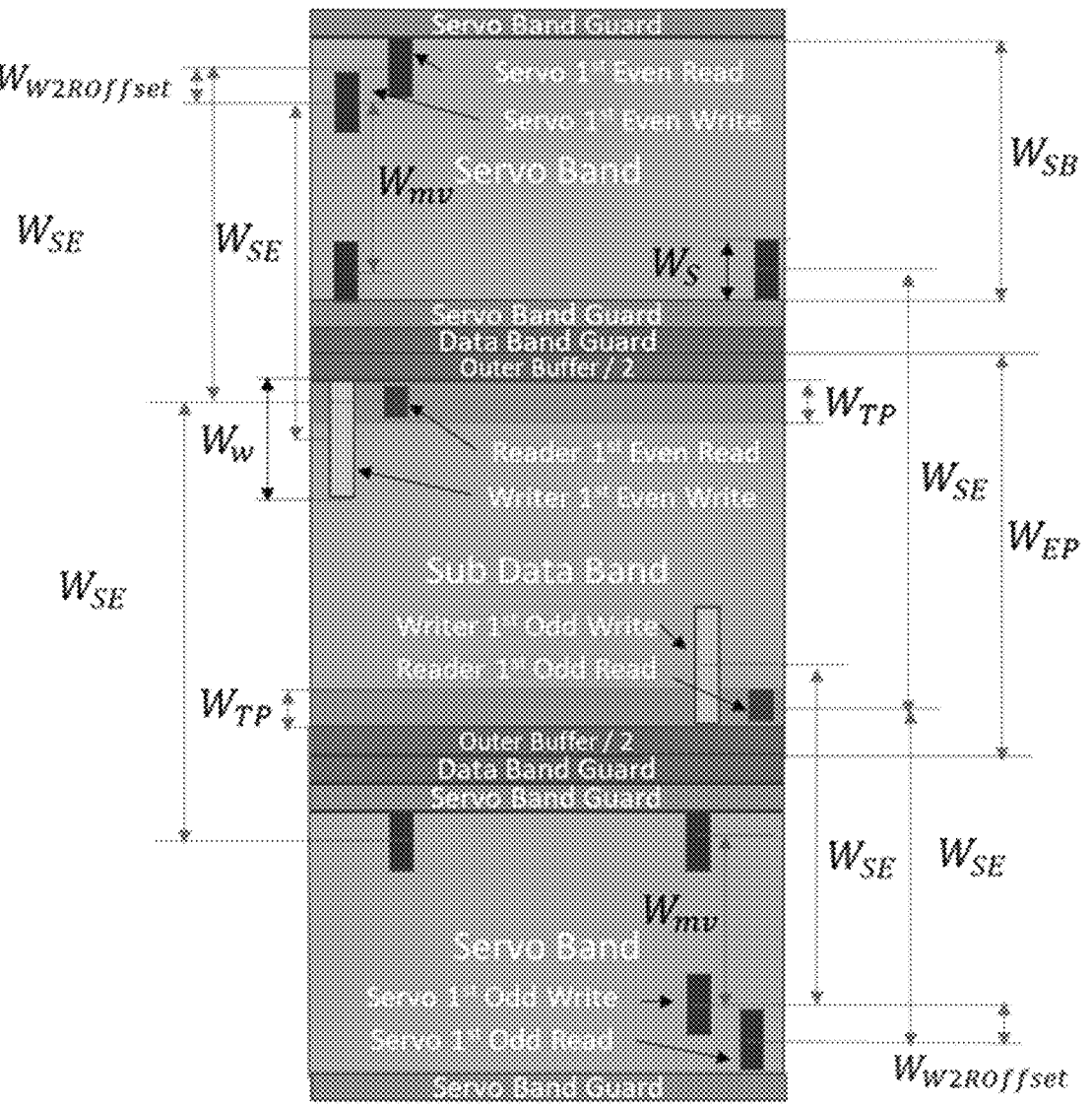

FIG. 17 is a schematic of the servo bands and a single sub data band for forward and reverse writing and reading, in accordance with one embodiment.

Figure 18:
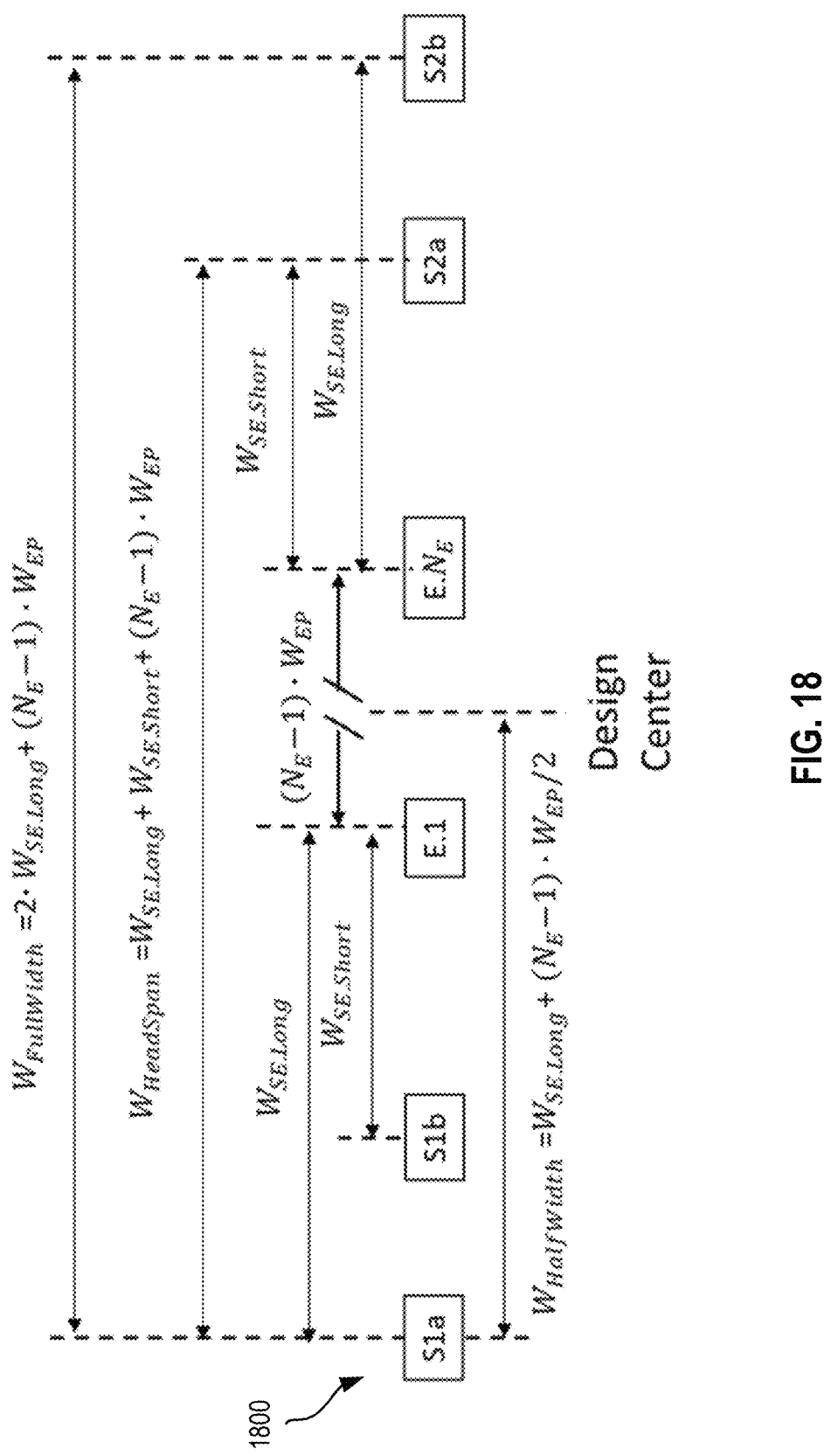

FIG. 18 is a schematic of a head group across a single data band with dual servos per servo band, in accordance with one embodiment.

Figure 19A:
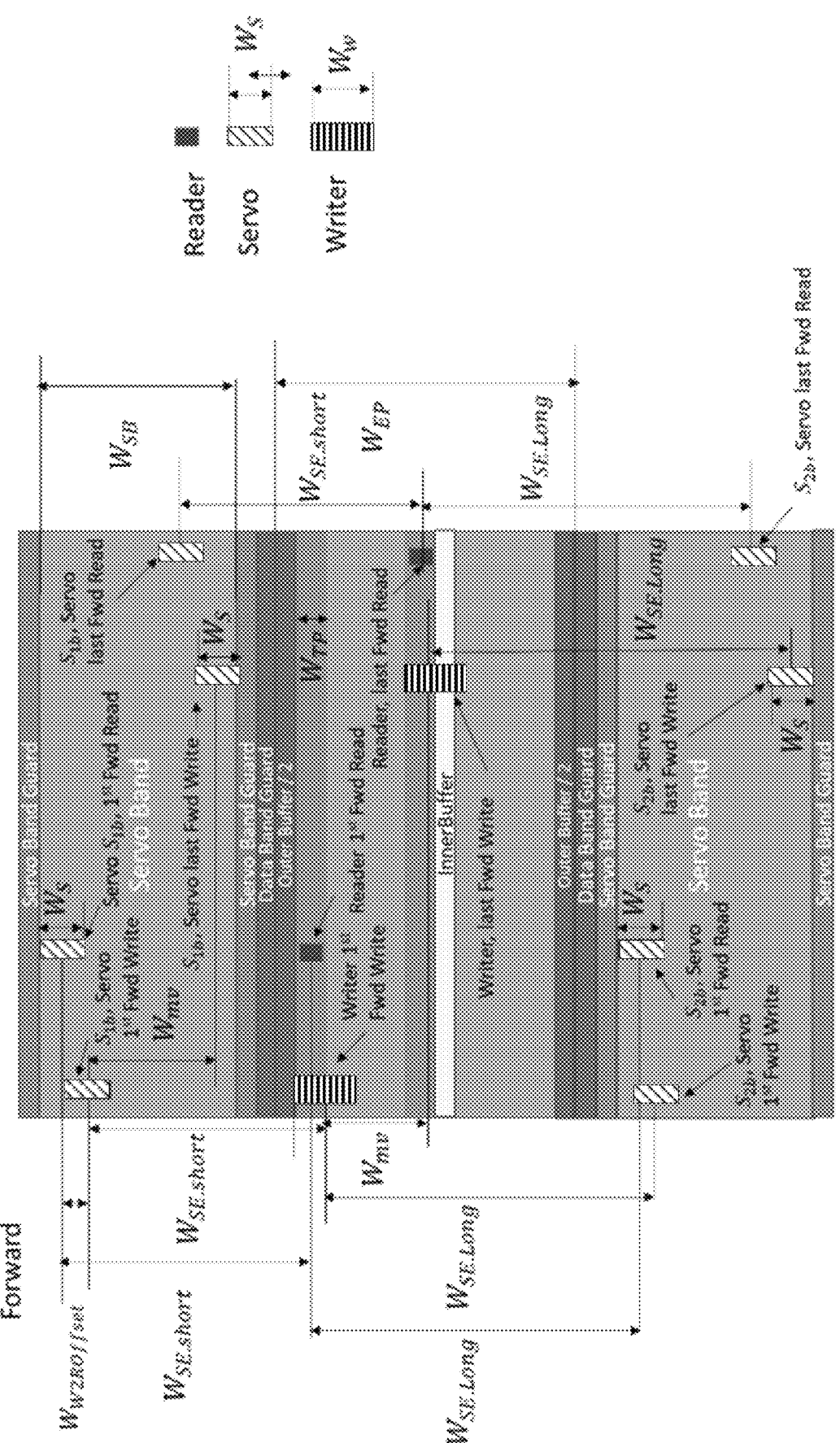

FIG. 19A is a schematic of Servo Bands around a single Sub Data Band for Forward Writing and Reading with Servos $S_{1b}$ and $S_{2b}$, in accordance with one embodiment.

Figure 19B:
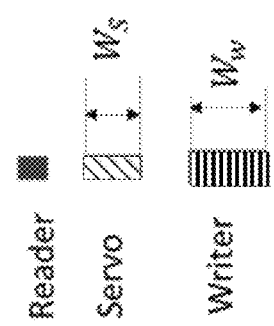

FIG. 19B is a schematic of Servo Bands around a single Sub Data Band for Reverse Writing and Reading with Servos $S_{1b}$ and $S_{2b}$, in accordance with one embodiment.

FIG. 20 is a schematic of a tilted head concept for tape dimensional stability (TDS) compensation.

Figure 21:
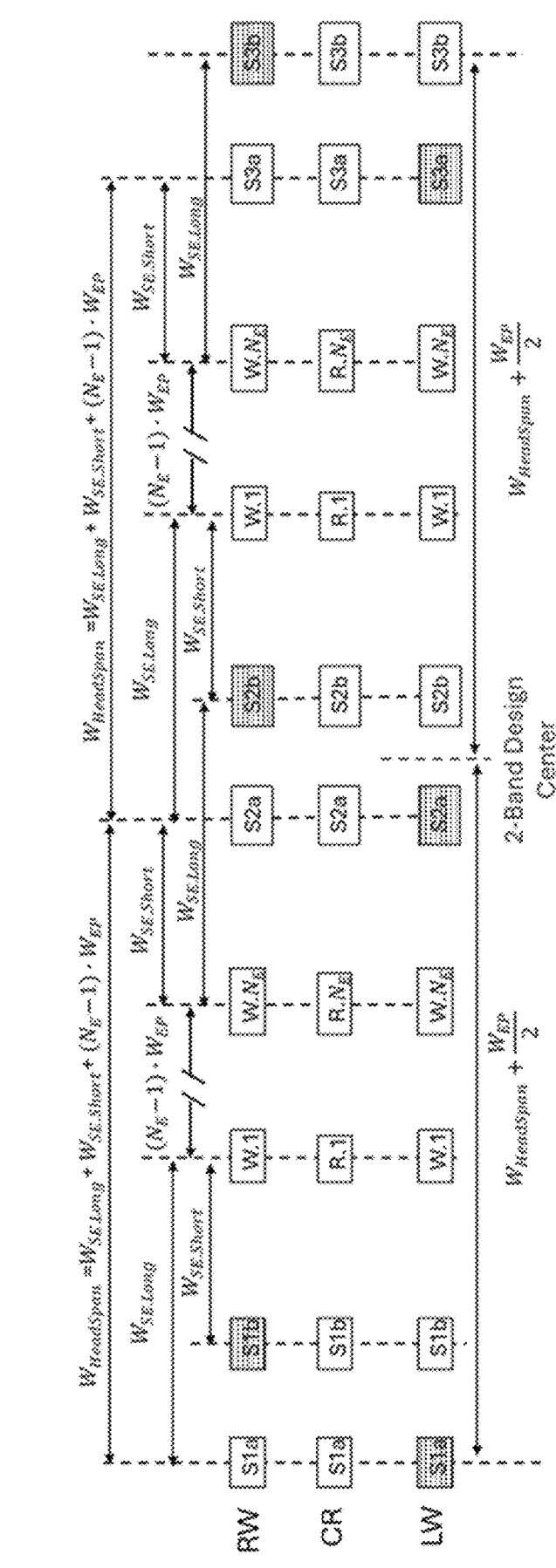

FIG. 21 is a schematic of a 3-module head alignment with a left writer (LW) module, a right writer (RW) module, and a center reader (CR) module, where each module is comprised of two element groups with $N_E$ elements in each group and three servo groups with two servos per servo band.

Figure 22:
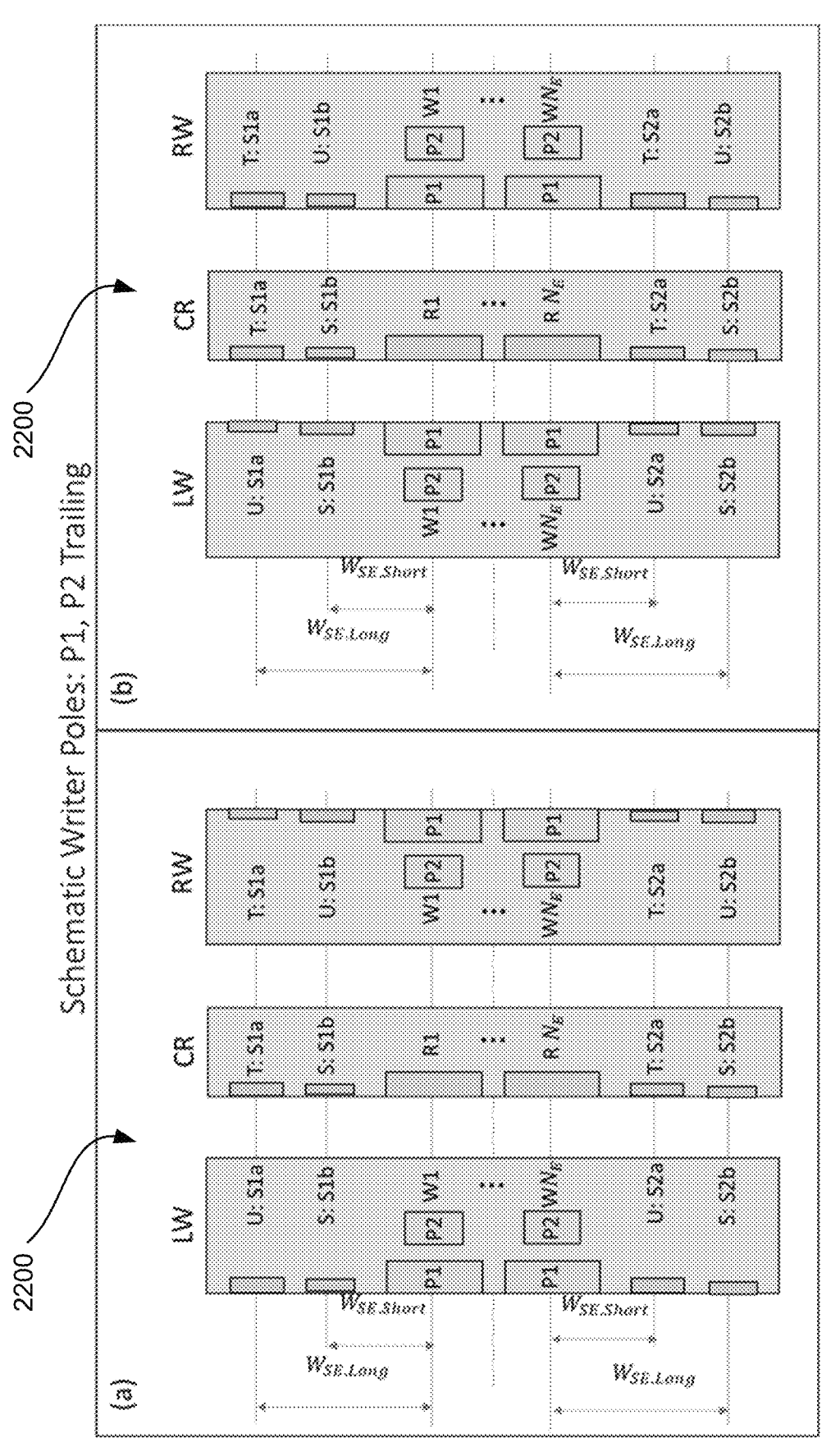

FIG. 22 is a schematic for a 1-Band Head with $N_E$ Elements utilizing Dual Servo Option for a 3-module Head alignment with a left writer (LW) module, a right writer (RW) module, and a center reader (CR) module.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" denotes an interval of accuracy that promotes the technical effect of the feature in question. In various approaches, the term "about" when combined with a value, refers to ±10% of the reference value.

The following description discloses several preferred embodiments of magnetic storage systems, as well as operation and/or component parts thereof. For example, described herein is a fully symmetric module for use with either 32- and 64-channel operations as well as extension to 32-, 64- and 128-channel operations. Furthermore, in achieving the desired symmetry, extra servos (servo readers) are introduced which may or may not be used in various possible modes of operation. Adding servos can assist in higher signal-to-noise ratios (SNR) for the servo operation, thereby improving the ability to track follow. Furthermore, modes that use the extra servos may generate more information about non-linear shifts of the head or media. While one of the elements on the head accounts for the locations of the servos, some approaches do not use some of the servos in operation. In preferred embodiments, the number of servos for a full span is higher than the minimum needed. For example, one embodiment includes a total of five servo bands for the full span, which is three more than the minimum (of two (2)) required for use in the full span or one more than needed for multi-product generation use.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 200 for enabling selection of one of at least two modes of operation of a magnetic tape head. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Figure 1:
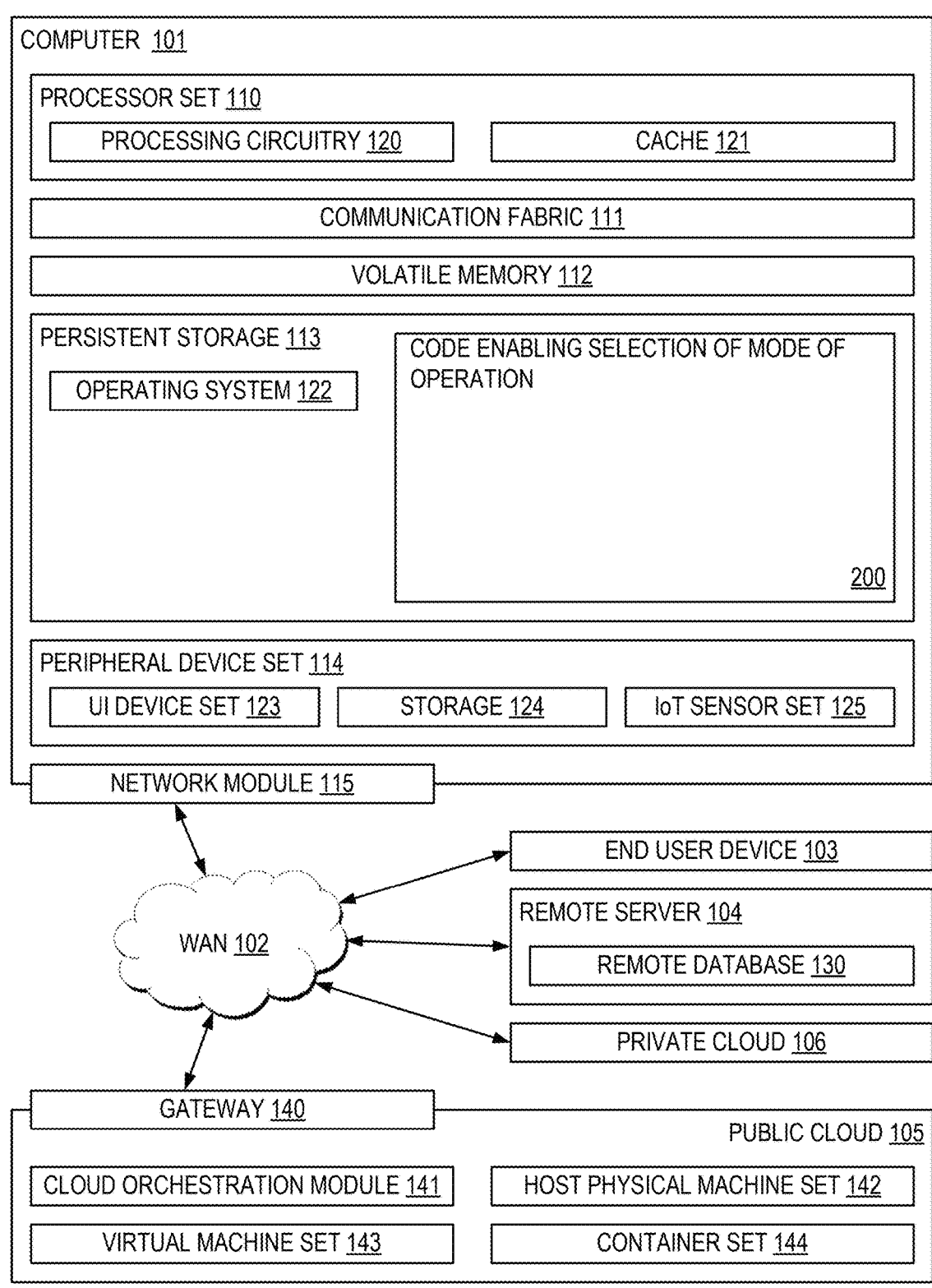
FIG. 1 is a diagram of a computing environment, in accordance with one embodiment of the present invention.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
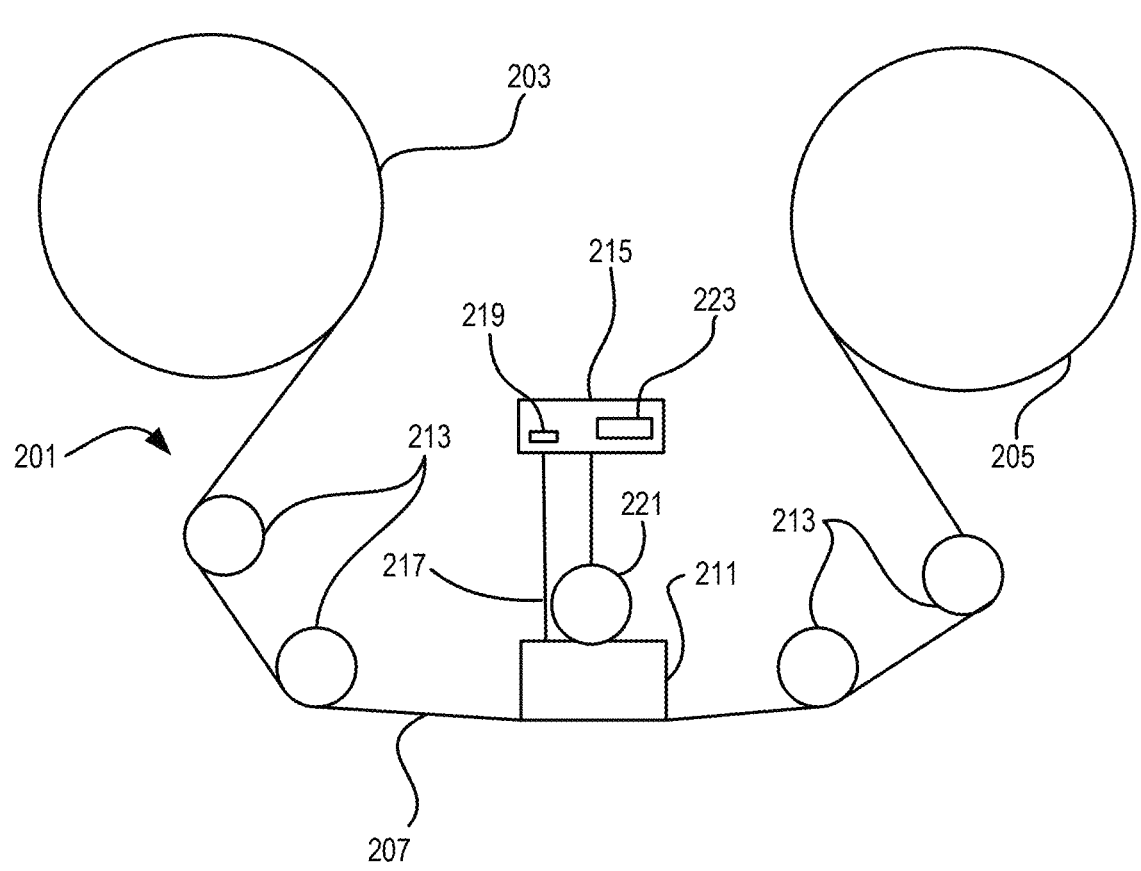
FIG. 2A is a schematic diagram of a simplified tape drive system, in accordance with one embodiment.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215. Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
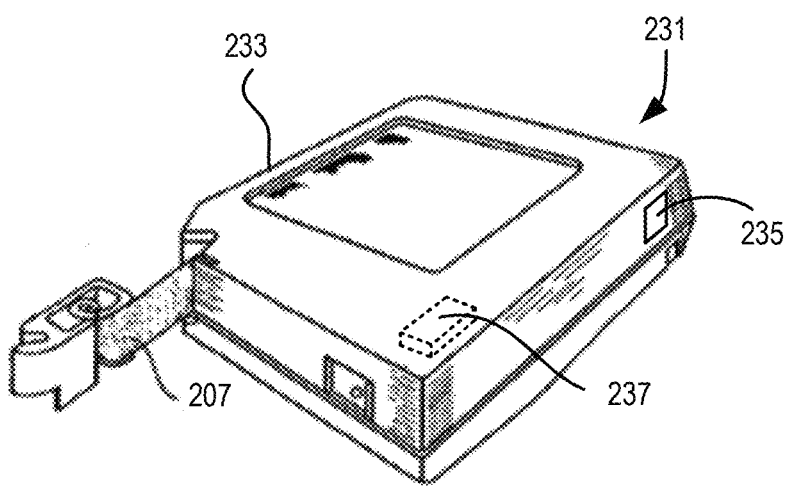
FIG. 2B is a schematic diagram of a tape cartridge, in accordance with one embodiment.

FIG. 2B illustrates an exemplary tape cartridge 231, according to one embodiment. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
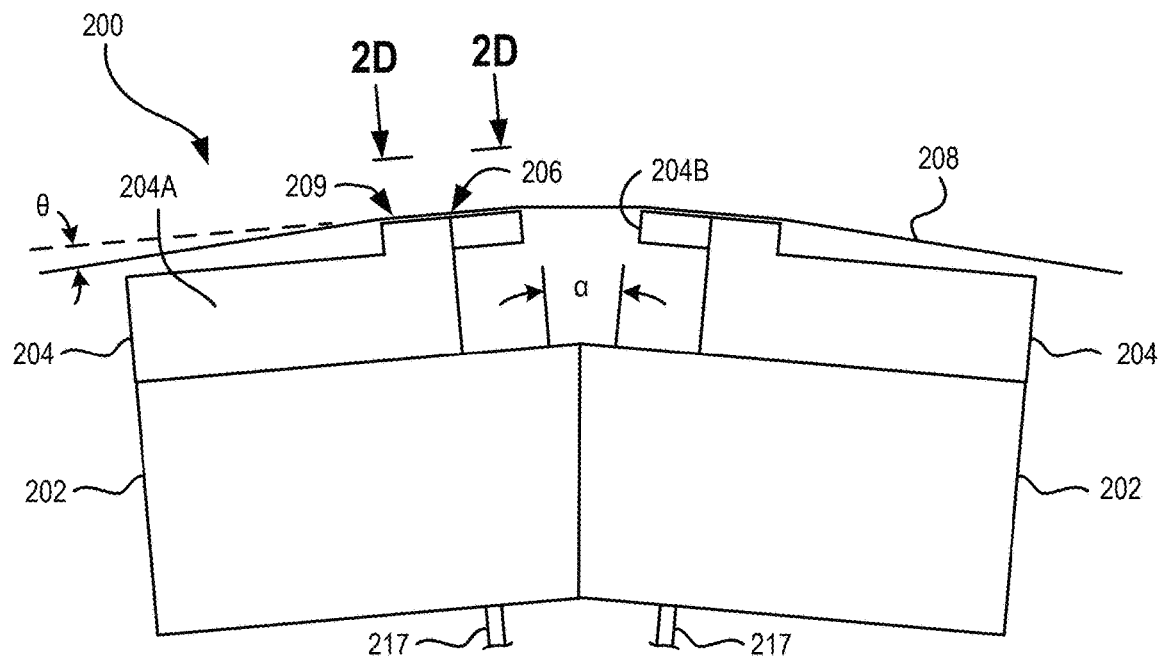
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
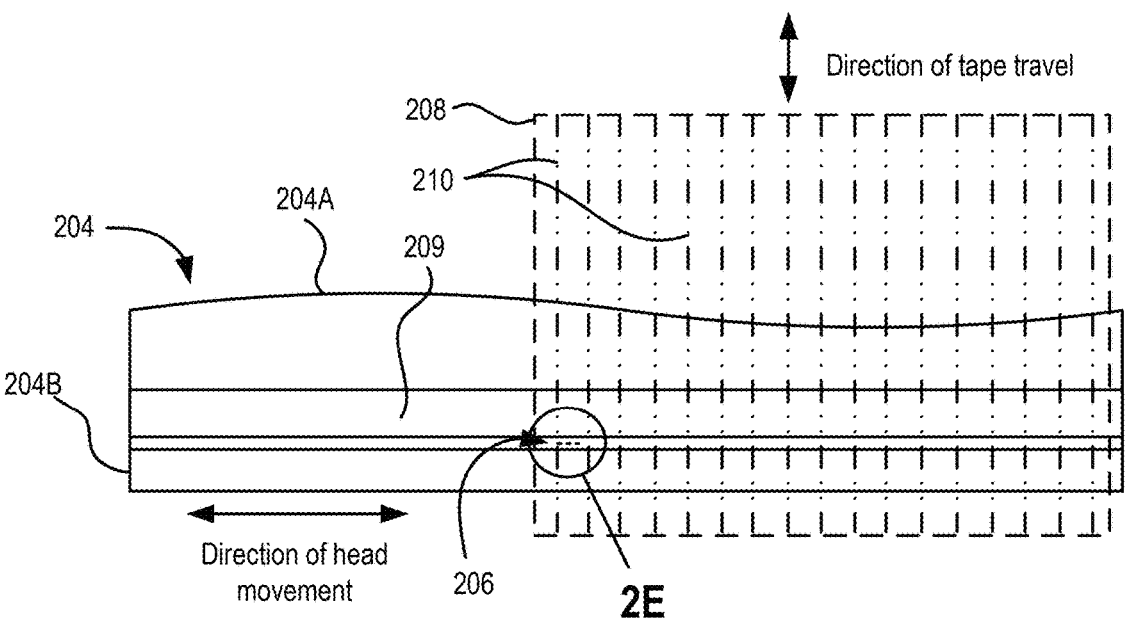
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2E:
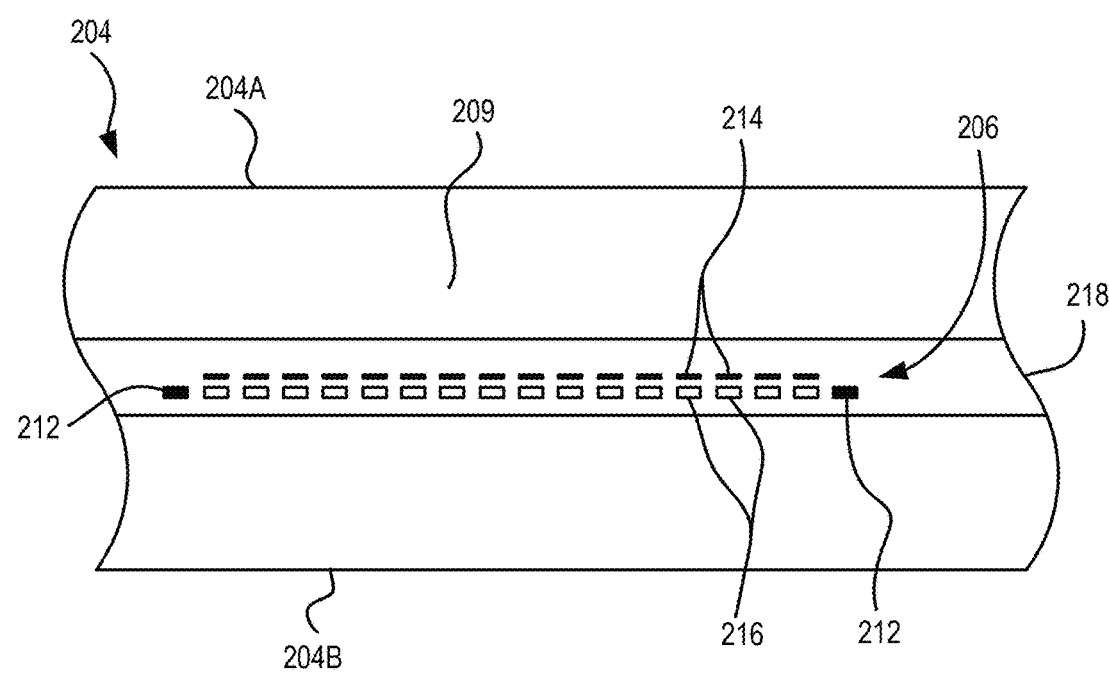
FIG. 2E is a detailed view taken from Circle 2E of FIG. 2D.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

Figure 2F:
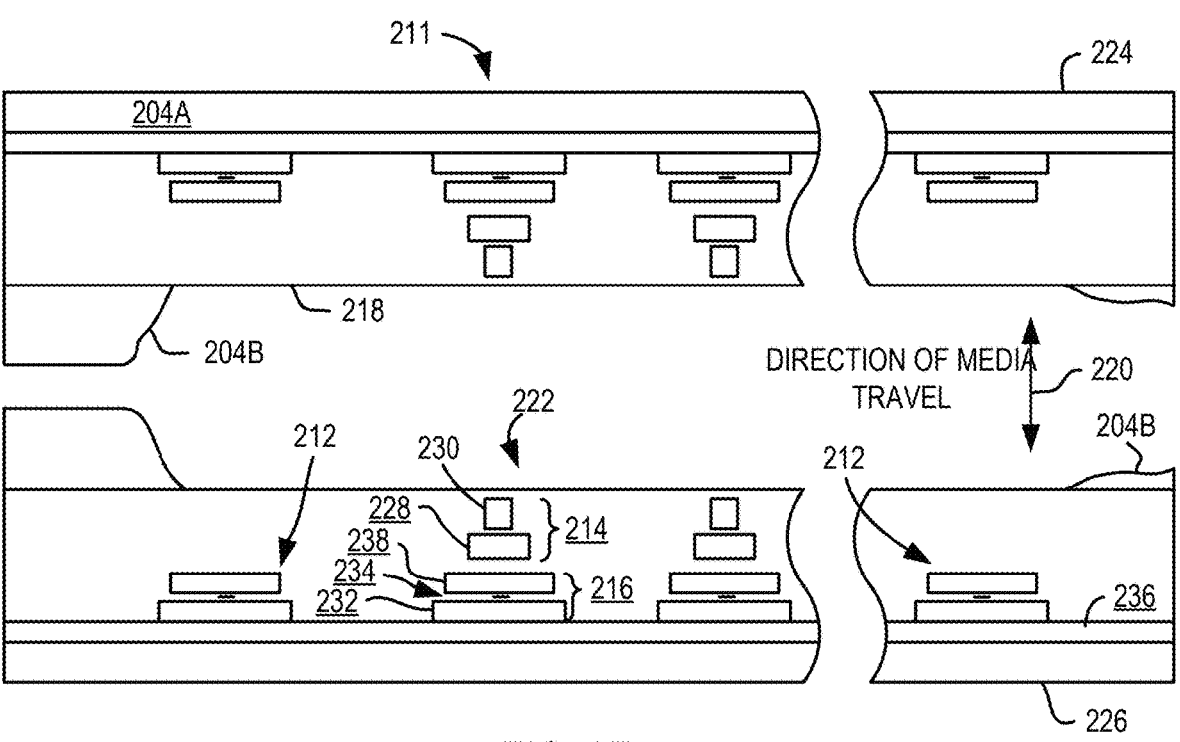
FIG. 2F is a detailed view of a partial tape bearing surface of a pair of modules.

FIG. 2F shows a partial tape bearing surface view of complementary modules of a magnetic tape head 211, according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
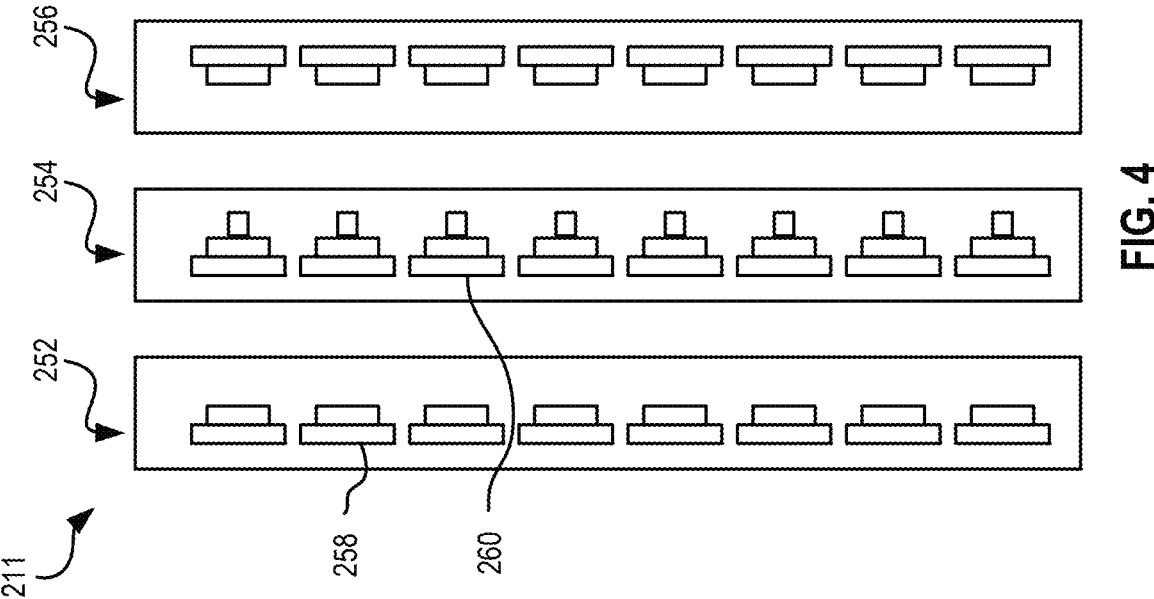
FIG. 4 is a partial tape bearing surface view of a magnetic head having a read-write-read configuration, in accordance with one embodiment.
Figure 3:
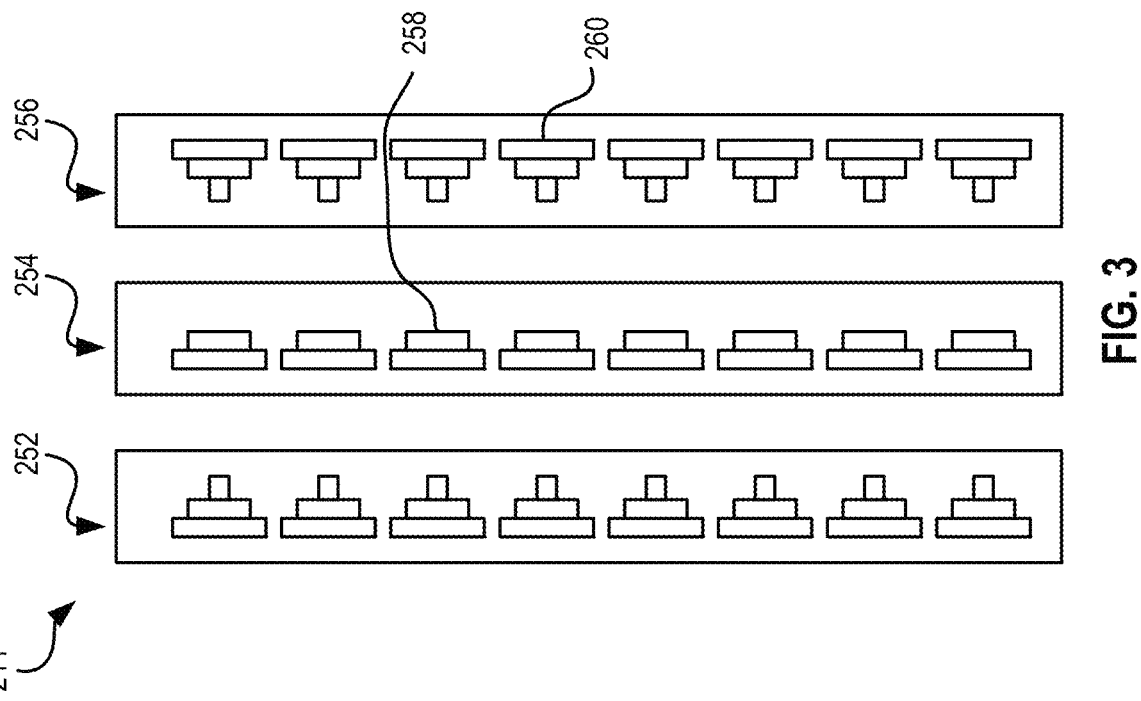
FIG. 3 is a partial tape bearing surface view of a magnetic head having a write-read-write configuration, in accordance with one embodiment.

The configuration of the tape head 211, according to one embodiment, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
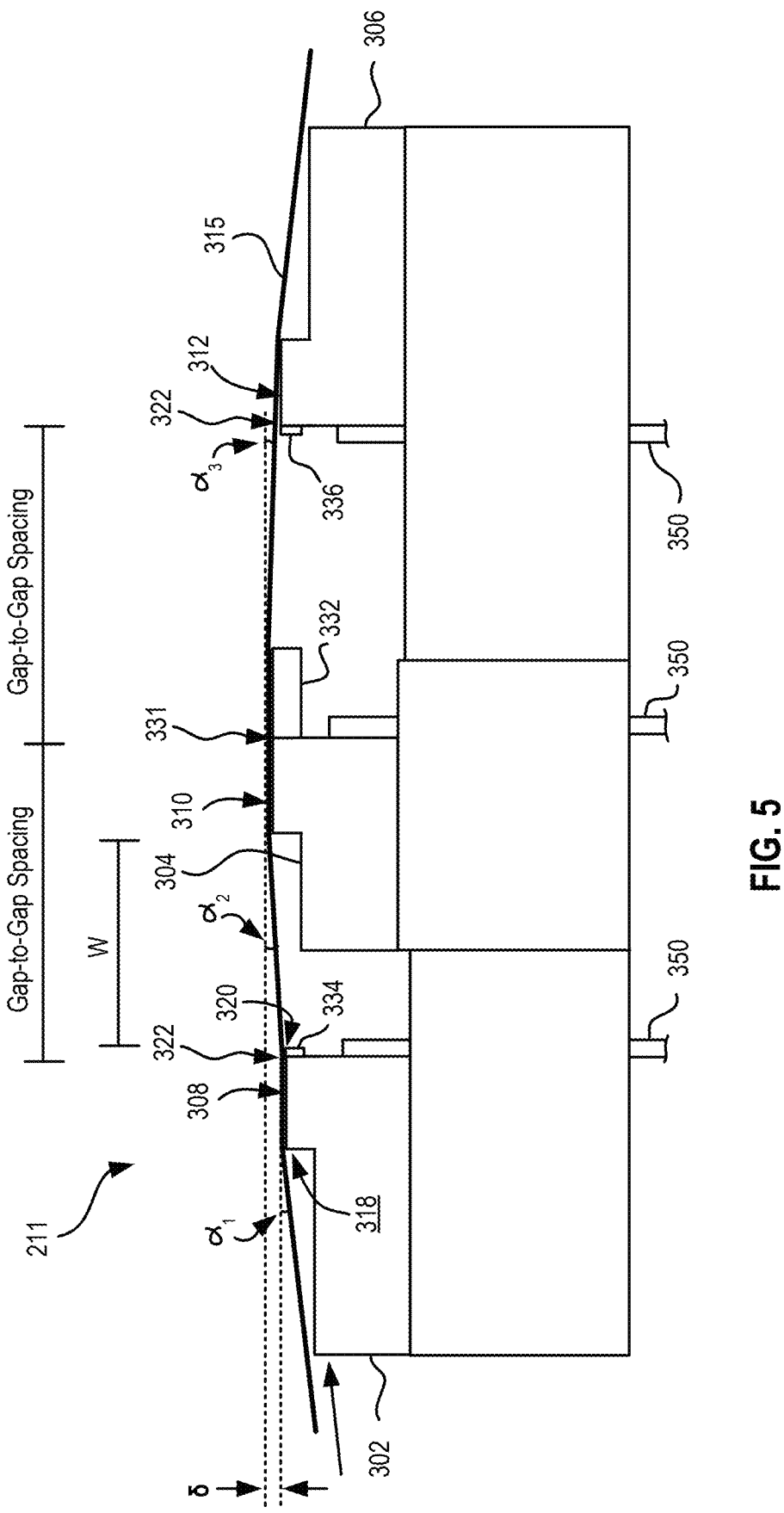
FIG. 5 is a side view of a magnetic tape head with three modules where the modules all generally lie along about parallel planes, in accordance with one embodiment.

FIG. 5 illustrates a magnetic head 211 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing." The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
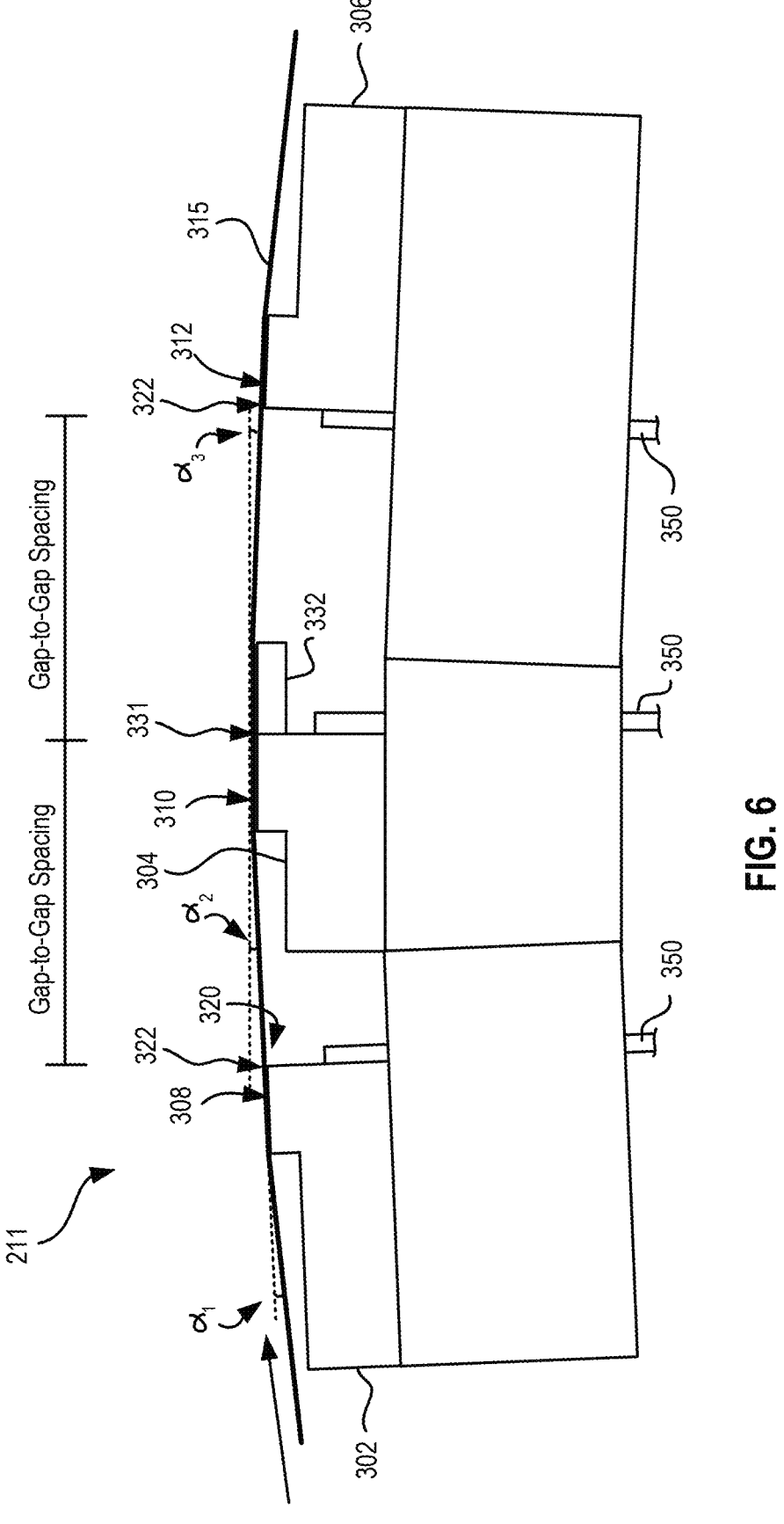
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
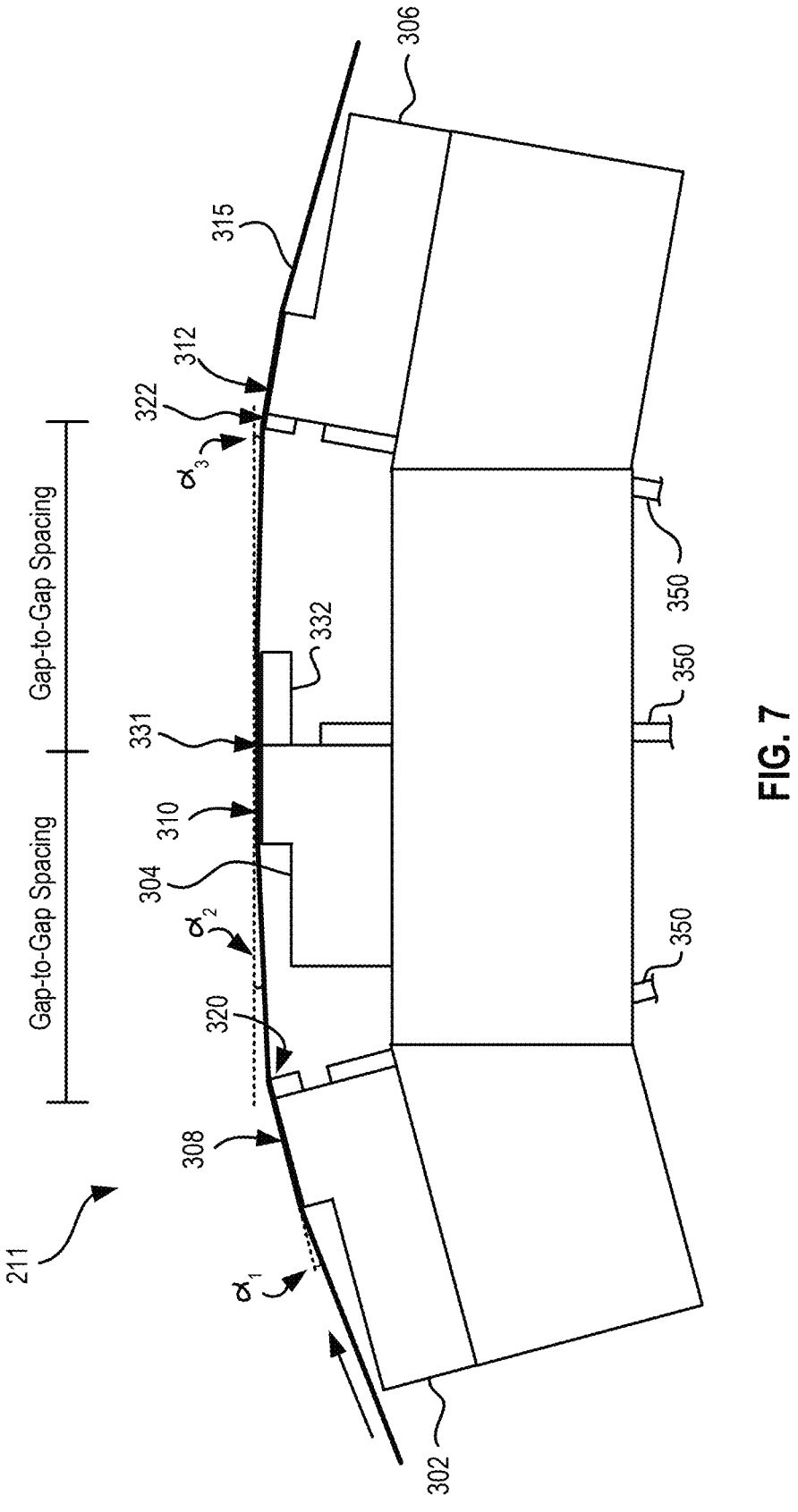
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 211 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
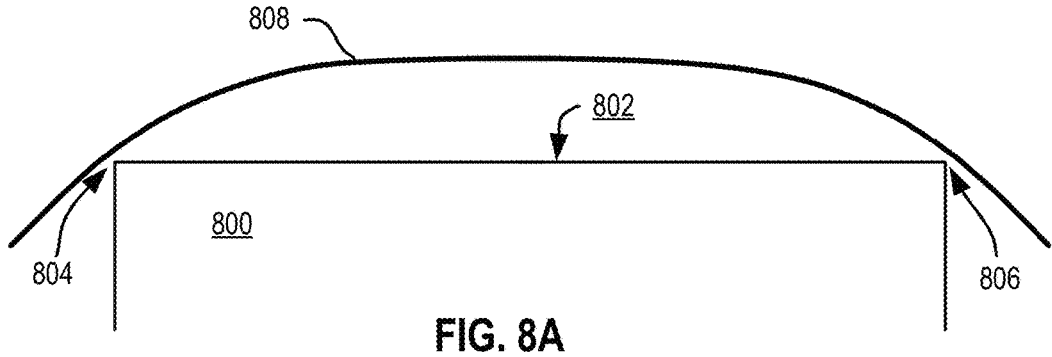
FIGS. 8A-8C are schematics depicting the principles of tape tenting.
Figure 8B:
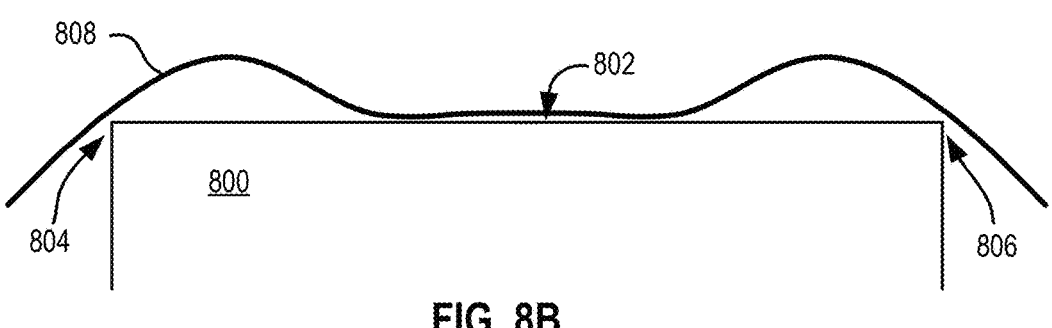
Figure 8C:
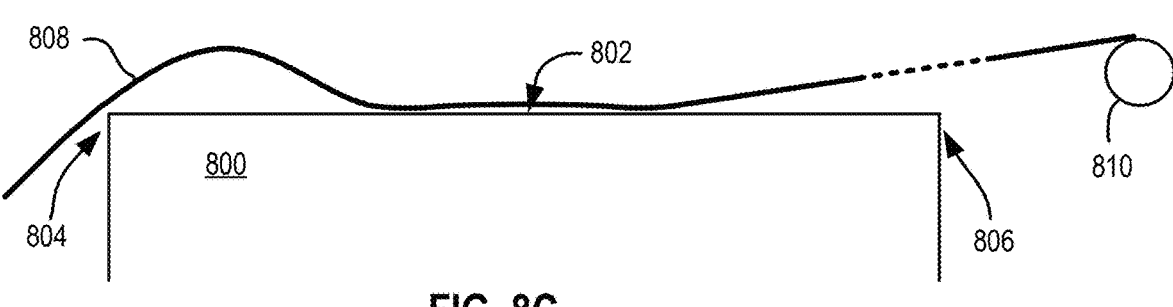

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS, which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
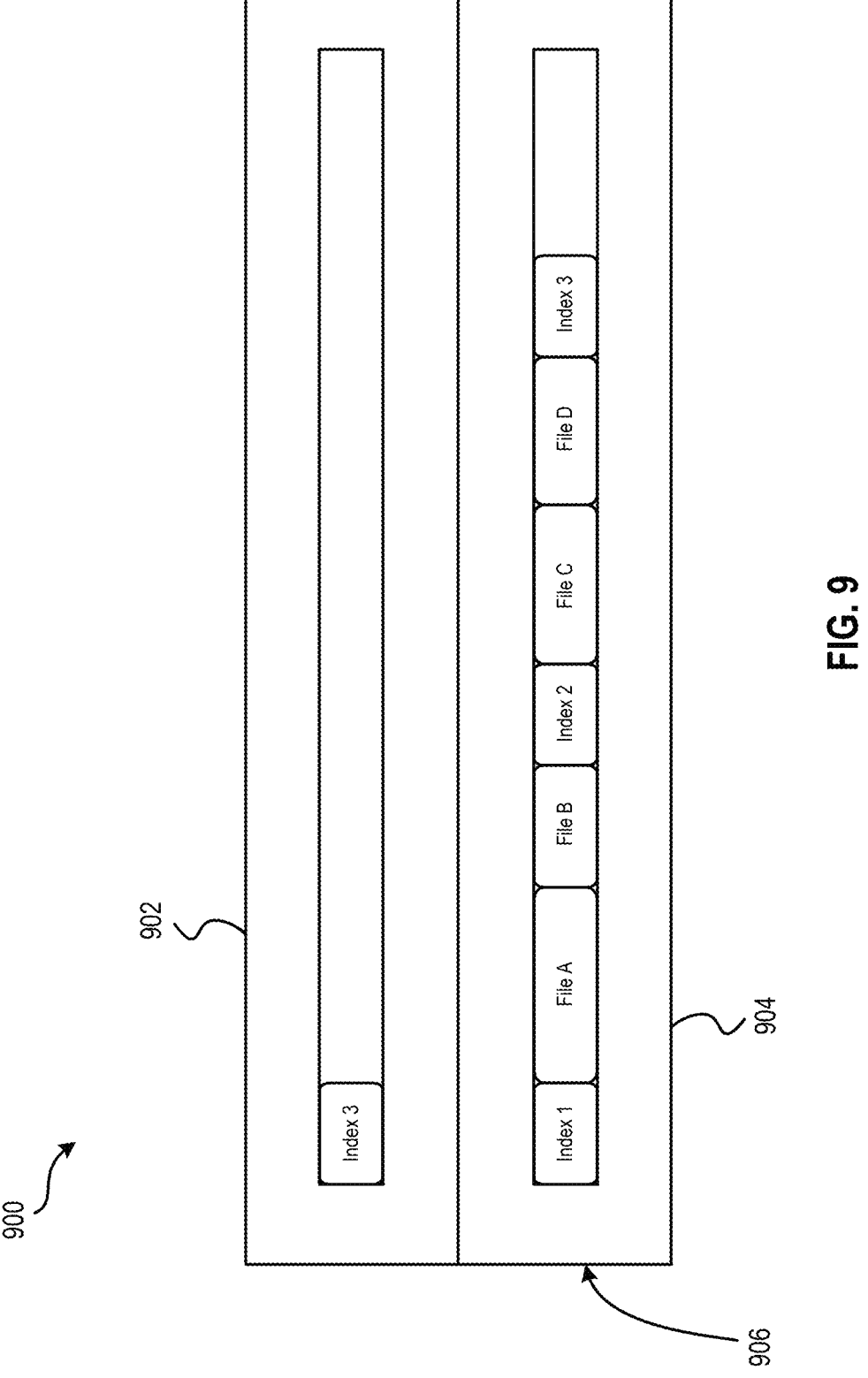
FIG. 9 is a representational diagram of files and indexes stored on a magnetic tape, in accordance with one embodiment.

Looking to FIG. 9, a magnetic tape 900 having an index partition 902 and a data partition 904 is illustrated, according to one embodiment. As shown, data files and indexes are stored on the tape. The data that makes up a data file is written to the data partition 904. The index file created in the index partition 902 and the data partition 904 stores file system meta information such as file names, locations on the data partition where the files are recorded, sizes, etc. This allows the data on the tape to be treated as a file on the file system. The LTFS format allows for index information to be recorded in the index partition 902 at the beginning of tape 906, thereby making it more readily accessible than the index information stored in the data partition 904.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above with reference to FIG. 2D, a magnetic recording tape is typically divided into multiple data bands, each band having a number of data tracks in which data is recorded along the length direction of the tape.

Conceptually, a tape drive divides the width of the tape into multiple areas (wraps) and records data in the length direction of the tape from the beginning to the end of the tape and from the end to the beginning for each wrap. The area in the tape width direction where valid data for each wrap is written is called a data track.

Figure 10:
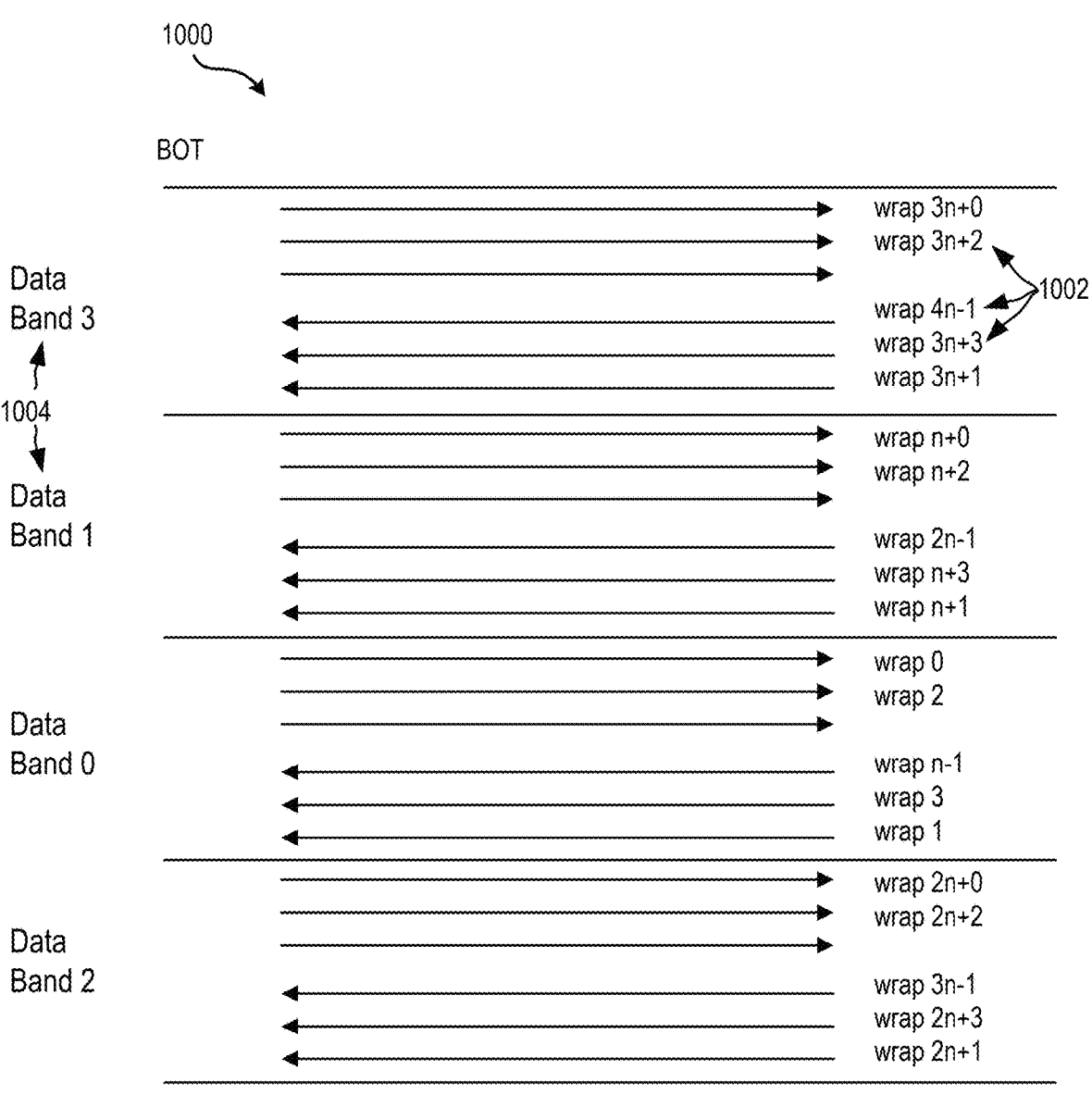
FIG. 10 is a conceptual diagram illustrating an exemplary general layout of wraps within data bands on a magnetic recording tape, in accordance with one embodiment.

FIG. 10 illustrates an exemplary general layout of wraps 1002 within data bands 1004 on a magnetic recording tape 1000, in accordance with one embodiment. As shown in FIG. 10, in even numbered wraps, recording is performed on the track while traveling from the beginning of tape (BOT) to the end of tape (forward direction). In odd numbered wraps, recording is performed while traveling from the end to the BOT (backward direction).

32 and 64 Channel, CH, Operation with 4 Groups of 16 Elements and 5 Groups of 2 Servos:

FIG. 11 depicts an apparatus 1100 configured for 32- and 64-channel operation, in accordance with one embodiment. As an option, the present apparatus 1100 may be implemented in conjunction with features from any other embodiment listed herein, such as those described with reference to the other FIGS. Of course, however, such apparatus 1100 and others presented herein may be used in various applications and/or in permutations which may or may not be specifically described in the illustrative embodiments listed herein. Further, the apparatus 1100 presented herein may be used in any desired environment.

As shown, the apparatus 1100 includes an array of magnetic transducers including elements E1-E64 and servos S1a-S5a and S1b-S5b. The "elements" as used herein refer to data elements, such as read transducers (readers), write transducers (writers), or both. The "servos" as used herein refer to servo readers. The array may be present on a chip, which forms a portion of a module, may be formed directly on the module, etc. Illustrative span lengths are also provided, noting that the lengths are presented by way of example only.

In the configuration shown, the apparatus has four groups EG1-EG4 of elements, each group having 16 elements E1-16, E17-E32, E33-E48, and E49-E64, respectively. The apparatus also includes five groups SG1-SG5 of two servos S1a-S1b, S2a-S2b, S3a-S3b, S4a-S4b, and S5a-S5b. The elements are centered about the midpoint 1102 of the array of elements/servos for both 32- and 64-channel operation.

The element pitch $W_{EP}$ between centers of adjacent elements in a group is the same. The region of tape written to or read by a group of 16 elements is a data band, DB, while the region written by a single element is a data sub band, DSB. The width of a DSB is $W_{EP}$.

The five groups SG1-SG5 of servos are positioned such that adjacent pairs of groups are located at opposite ends of the data element groups, e.g., SG1 and SG2 are located at opposite ends of EG1, and so on. Each servo group n has two servos, $S_{na}$ and $S_{nb}$, where n represents the $n^{th}$ servo group. In operation, the "a" servos ($S_{na}$) and the "b" servos ($S_{nb}$) may be used individually or together. Servos $S_{na}$ are used to span the first half of the DSB (left in FIG. 11) while servos $S_{nb}$ are used to span the second half of the DSB (right in FIG. 11). The direction of tape travel 1106 is up and down, and the tracks are written vertically in the FIG. 1f the tape orientation is rotated clockwise 90 degrees from the direction 1106 shown, left could be referred to as "top" and right as "bottom". These terms may be interchanged in this document.

The elements and servos are preferably formed on a common substrate via conventional thin film processes that are adapted according to the teachings herein to create the various unique and novel configurations disclosed herein. The elements and servos may be of conventional construction. The substrate may be a chip that is, or forms part of, the module.

In a 32 channel (32CH) mode, all 16 elements in EG2 and all 16 elements in EG3 are used for a total of 32 elements. The servos in SG2, SG3, and SG4 may be used, or only servos from two of the servo groups.

In a 64 channel (64CH) mode, all 16 elements in each of EG1-EG4 are used for a total of 64 elements. The servos from only some of the servo groups may be used, or servos from all five servo groups, SG1 to SG5 of the servo groups may be used.

FIG. 12 is a partial representative view of the apparatus 1100 configured for 32 and 64 channel operation of FIG. 11, particularly showing spacing between elements and servos. As shown, the four groups EG1-EG4 of 16 elements are arranged and positioned such that the element pitch, $W_{EP}$, between adjacent elements in a group is the same.

The distance between $S_{na}$ and the first element in the $n^{th}$ group is $W_{SE.Long}$. The distance between $S_{n+1,b}$ and the last ($16^{th}$) element in the $n^{th}$ group is also $W_{SE.Long}$.

The distance between $S_{nb}$ and the first element in the $n^{th}$ group is $W_{SE.Short}$. The distance between $S_{n+1,a}$ and the last ($16^{th}$) element in the $n^{th}$ group is also $W_{SE.Short}$.

The centerline 1102 of the array is halfway between the last element (E32) in EG2 and the first element (E33) in EG3.

In FIG. 12, the distance S1a to S5a is termed the 64 CH span, $W_{Spa.64CH}$. The distance from S1b to S5b is also $W_{Spa.64CH}$. The distance from S1a to S3a is termed the 32

CH span, $W_{Spa.32CH}$. The distances from S2a to S4a and S2b to S4b are also the 32 CH span, $W_{Spa.32CH}$ and are the preferred usage for a 32 CH option using EG2 and EG3. One can envision other "couplings" which have the same span.

32- and 64-Channel Operation with Two Groups of 32 Elements and Three Groups of 2 Servos:

FIGS. 13A-13C depict an apparatus 1300 for 32- and 64-channel operation, in accordance with one embodiment. As an option, the present apparatus 1300 may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment.

As shown, the apparatus 1300 includes two groups EG1, EG2 of elements E01-E64, each group having 32 elements E01-E32 and E33-E64, respectively. The apparatus also includes three groups of two servos S1a and S1b, S2a and S2b, S3a and S3b in the same transducer array. The elements are centered about the center line 1304 (midpoint) of the array of elements/servos for both 32- and 64-channel operation.

The elements and servos are preferably formed on a common substrate via conventional thin film processes that are adapted according to the teachings herein to create the various unique and novel configurations disclosed herein. The elements and servos may be of conventional construction. The substrate may be a chip that is, or forms part of, the module supporting the array. The functionality of the elements and servos may be generally conventional in terms of reading, writing, and track following, with appropriate adaptations made to how the reading, writing and track following are performed, according to the teachings herein.

The element pitch $W_{EP}$ (shown as $W_{EPo}$) between centers of adjacent pairs of elements in an element group is the same. The region of tape written by a group of 32 elements is a data band (DB), while the region written by a single element is a data sub band (DSB). The width of a DSB may be $W_{EP}$, but could be slightly larger or smaller. Three groups SG1-SG3 of servos S1a-S3b are present, with servo groups being positioned on opposite ends of the data element groups. Each servo group has two servos, $S_{na}$ and $S_{nb}$, where n represents the $n^{th}$ servo group. In operation, the "a" servos ($S_{na}$) and the "b" servos ($S_{nb}$) are used together. Servos $S_{na}$ are used to span the first half of the DSB (left in FIG. 13A) while servos $S_{nb}$ are used to span the second half of the DSB (right in FIG. 13A).

FIG. 13B shows a portion of the apparatus 1300 that is used in a 32CH mode, wherein only the 16 odd elements, E01, E03, . . . , E29, E31 in EG1 and 16 odd elements, E01, E03, . . . , E29, E31 in EG2 are used. Only the elements in EG1 are shown and the servos from SG1 and SG2. For this usage, the element pitch is $2 \cdot W_{EP}$, so both servos in a particular servo group are used. For the left (top) half of the DSB, servos $S_{na}$ are used for track following. For the right (bottom) half of the DSB, servos $S_{nb}$ are used for track following.

FIG. 13C shows a portion of the apparatus 1300 that is used in a 64 channel (64CH) mode, wherein all 32 elements in EG1 and all 32 elements in EG2 are used for a total of 64 elements. Only the elements in EG1 are shown and the servos from SG1 and SG2. In this case, only one servo in each SG is needed to span the 64CH element pitch, $W_{EP}$. For this usage, servos $S_{nb}$ may be used.

Various embodiments include the apparatus 1300 configured for 32- and 64-channel operation. The configuration of the apparatus 1300 generally corresponds to that shown in FIGS. 13A-13C, as described above. As an option, the embodiments of the apparatus 1300 described below may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment.

The apparatus 1300 includes a first group EG1 of evenly-spaced elements, the first group having a number $(N_E)=32$ of the elements including at least a first element E01, a last element E32, and a second-to-last element E31 of the first group. The apparatus also includes a second group EG2 of evenly-spaced elements adjacent the first group and extending along a longitudinal axis of the first group, the second group having $N_E=32$ of the elements including at least a first element E33, a last element E64, and a second-to-last element E63 of the second group. A plurality of servos are also present, including at least a first servo S1a, a second servo S1b, a third servo S2a, a fourth servo S2b, a fifth servo S3a, and a sixth servo S3b.

The elements of the first group are spaced by an element pitch $(W_{EPo})$. The elements of the second group are spaced by the element pitch $(W_{EPo})$. The third and fourth servos S2a, S2b are positioned between the first and second groups EG1, EG2. The first element E01 in the first group and the first servo S1a are separated by a first distance $(W_{SE.Long})$. The second-to-last element E31 in the first group and the fourth servo S2b are separated by the first distance $(W_{SE.Long})$, where "separated by" as used herein preferably refers to a center to center spacing.

The first element E33 in the second group and the third servo S2a are separated by the first distance $(W_{SE.Long})$. The second-to-last element E63 in the second group and the sixth servo S3b are separated by the first distance $(W_{SE.Long})$.

The first element E01 in the first group and the second servo S1b are separated by a second distance $(W_{SE.Short})$. The second-to-last element E31 in the first group and the third servo S2a are separate by the second distance $(W_{SE.Short})$. The last element E32 in the first group and the fourth servo S2b are separate by the second distance $(W_{SE.Short})$. The first element E33 in the second group and the fourth servo S2b are separated by the second distance $(W_{SE.Short})$. The second-to-last element E63 in the second group and the fifth servo S3a are separate by the second distance $(W_{SE.Short})$. The last element E64 in the second group and the sixth servo S3B are separate by the second distance $(W_{SE.Short})$.

The first servo S1a and the third servo S2a are separated by a third distance, termed $W_{spanG1}$. Viewing FIG. 13B, $W_{spanG1}$ is equal to $2 \cdot W_{SE.Short}+(N_E-1)$. $W_{EP64}$, wherein $W_{EP64} \cong W_{EPo}$. The second servo S1b and the fourth servo S2b are separated by the third distance. The third servo S2a and the fifth servo S3a are separated by the third distance. The fourth servo S2b and the sixth servo S3b are separated by the third distance.

Viewing FIG. 13A, the first servo S1a and the third servo S2a are separated by a distance termed $W_{spanG2}$ which is equal to $W_{SE.Short}+(N_E/2-1) \cdot (2 \cdot W_{EP64})+W_{SE.Long}$. See FIG. 13B. $W_{spanG1}$ and $W_{spanG2}$ are equal.

Equating the terms $W_{spanG1}$ and $W_{spanG2}$ requires that $W_{SE.Long}=W_{SE.Short}+W_{EP64}=W_{SE.Short}+W_{EP32}/2$, wherein $W_{SE.Long}\cong2\cdot W_{EPo}=2\cdot W_{EP64}$.

In one embodiment, the apparatus is preferably configured to operate on a magnetic recording tape having a plurality of servo bands, the servo bands being separated by a distance equal to the third distance.

In another embodiment, the apparatus is configured to operate on a magnetic recording tape having a plurality of servo bands, the servo bands being separated by a distance that is less than the third distance. Such formatting is useful when the array of elements and servos is nominally tilted, e.g., for compensating for known types of tape dimensional stability (TDS) such as tape lateral expansion and contraction.

In some embodiments, all of the elements in the groups are data readers. In other embodiments, all of the elements in the groups are data writers. In further embodiments, the elements included data readers and writers, e.g., piggy-backed elements.

With the symmetric design 1300, the user can build a module which can be used either for an exclusive 32CH mode connecting only the odd 32 Elements and the required servos from SG1 and SG2 and SG3, as well as a 64CH mode connecting all 64 Elements and the required servos from SG1 and SG2 and SG3. The module is completely interchangeable between use for a 32CH drive or a 64CH/32CH drive.

As shown in FIG. 13A, the elements in the groups are symmetrical about a centerline 1304 positioned between the groups.

The apparatus may include tape drive components such as a drive mechanism for passing a magnetic recording tape over a magnetic head having the groups of elements, a controller electrically coupled to the elements, etc.

In one exemplary embodiment, $W_{EP64}=46.63$ µm±10% and the magnetic head is operated with a 10 degree tilt.

In one exemplary embodiment, $W_{SE.Short}=52.60$ µm±10% and the magnetic head is operated with a 10 degree tilt.

Accordingly, the apparatus is configured to selectively perform 32-channel operation using only some of the elements from both of the groups EG1 and EG2, and 64-channel operation using all of the elements from both of the groups EG1 and EG2.

32 and 64 and 128 Channel, CH, Operation with 4 Groups of 32 Elements and 5 Groups of 2 Servos:

FIG. 14 depicts an apparatus 1400 for 32-, 64-, and 128-channel (128CH) operation, in accordance with one embodiment. In the text for FIG. 14, the anacronym MDBs is used, and refers to Media Data Bands. The media has $N_{DB}$ MDBs and $N_{DB}+1$ Media Servo Bands, MSBs. As an option, the present apparatus 1400 may be implemented in conjunction with features from any other embodiment listed herein, such as those described with reference to the other FIGS. Of course, however, such apparatus 1400 and others presented herein may be used in various applications and/or in permutations which may or may not be specifically described in the illustrative embodiments listed herein. Further, the apparatus 1400 presented herein may be used in any desired environment.

As shown, the apparatus 1400 includes four groups EG1-EG4 of elements E1-E128, with each group having 16 elements, or 32 elements as shown. Five servo groups SG1-SG5 are also present, with two servos S1a-S5b per servo group. Preferably, the elements and servos are present on a single chip.

In various embodiments, the apparatus 1400 is capable of operating on a magnetic recording medium having four data bands and five servo bands. In other embodiments, the apparatus 1400 is capable of operating on a magnetic recording medium having eight data bands and nine servo bands. When used with such media, various modes of operation are possible. In an exemplary 128CH mode of operation, the four groups EG1 to EG4, each having 32 elements are used across four Media Data Bands, MDBs. The tape has five servo bands spanning the four data bands: SG1, EG1, SG2, EG2, SG3, EG3, SG4, EG4, SG5. The media can replicate these data and servo bands. For example, another option is eight Media Data Bands and nine Servo Data Bands corresponding to: SG1, EG1, SG2, EG2, SG3, EG3, SG4, EG4, SG5, EG5, SG6, EG6, SG7, EG7, SG8, EG8, SG9, For the eight Data Bands, option, in one direction, say Forward writing or reading, the module would span SG1 to SG5, using EG1 to EG4 to write and read to Media Bands MB1 to MB3. In the other direction, say Reverse writing or reading, the module would span SG5 to SG9, using EG1 to EG4 to write and read to Media Bands MB4 to MB8. In an exemplary first mode of 64CH operation, only the odd (or even) elements of all four groups EG1-EG4 are used across four MDBs. Three options of using the servos could be used during data operations such as read and/or write. One option is to use SG1 and SG5; a second option is to use SG1, SG3 and SG5; a third option is to use SG1, SG2, SG3, SG4 and SG5. In these three options, $S_{n,b}$ and $S_{n+1,b}$ would be used in both directions, say Forward and Reverse.

In an exemplary mode of 64CH operation, only the odd elements in EG1, EG2, EG3 and EG4 would be used, which accounts for 4×16 elements. One option is to use SG1 and SG5; a second option is to use SG1, SG3 and SG5; a third option is to use SG1, SG2, SG3, SG4 and SG5. In these three options, $S_{n,a}$ and $S_{n+1,a}$ would be used in one direction, say Forward, and $S_{n,b}$ and $S_{n+1,b}$ would be used in the other direction, say Reverse.

Another exemplary mode of 64CH operation would be to use all 32 elements in the two central groups, EG2 and EG3 would be used to write to two MDBs. One option of servos would be SG1 and SG3. A second option of servos would be SG1, SG2 and SG3. For one direction, say Forward, $S_{n,a}$ and $S_{n+1,a}$ would be used for the chosen servo groups. For the other direction, say Reverse, $S_{n,b}$ and $S_{n+1,b}$ would be used for the chosen servo groups.

In further embodiments, the apparatus 1400 is capable of operating on a magnetic recording medium having eight data bands and nine servo bands. When used with such media, various modes of operation are possible. In an exemplary 128CH mode of operation, the four groups EG1-EG4 of 32 elements are used across four MDBs. All servo groups SG1-SG5 are used during data operations such as read and/or write. In an exemplary first mode of 64CH operation, only the odd (or even) elements of all four groups EG1-EG4 are used across four MDBs, and all servo groups SG1-SG5 are used during data operations such as read and/or write. In an exemplary second mode of 64CH operation, only the center two groups EG2-EG3 of elements are used across one MDB. Only servo groups SG2, SG3 and SG4 are used. Equivalently, any adjacent pair of EGs and corresponding SGs could be used in alternate embodiments. Various embodiments encompassed by the apparatus 1400 of FIG. 14 are as follows.

Media 4 DBs and 5 SBs
   128 CH: 4 groups of 32 Elements across 2 MDBs. Use
      Servo groups: only 1, 3 and 5

64 CH: 4 groups of 32 Elements across 2 MDBs. Only use Odd Elements. Use Servo groups: only 1, 3 and 5

64 CH: only use center 2 groups of 32 Elements across 1 MDBs. Use Servo groups: only 2 & 4

Media 8 DBs & 9 SBs

128 CH: 4 groups of 32 Elements across 4 MDBs. Use Servo groups: 1 to 5

64 CH: 4 groups of 32 Elements across 4 MDBs. Only use Odd Elements. Use Servo groups: 1 to 5

64 CH: only use center 2 groups of 32 Elements across 3 MDBs. Use Servo groups: 2, 3 & 4

An exemplary magnetic recording medium has nine evenly spaced servo bands separated by a distance of about 1435.51 µm with servo patterns in the servo bands being rotated by 10 degrees with respect to a track width orientation and a width of the servo band containing the servo patterns is about 54.84 mm.

The apparatus 1400 may be a modified version of the design of the apparatus 1300 for 32 and 64 CH operation shown in FIG. 13 using the two groups of 32 elements. With continued reference to FIG. 14, the aforementioned design of FIG. 13 can be translated to the design shown in FIG. 14 which includes 128 CH operation by merely duplicating the design to be four groups EG1-EG4 of 32 elements and five groups SG1-SG5 of two servos. The description given in the preceding section works, with appropriate modifications that would be apparent to one skilled in the art after reading the present disclosure, with the "128CH" design substituting EG2 and EG3 into EG1 and EG2 and SG2-SG4 into SG1-SG3 of the preceding design description. The 128CH design usage is a self-explanatory extension from the earlier descriptions. In the 128CH version, all elements in EG1-EG4 are used. In operation, one can choose any of three servo options: (a) $S_{1b}$ and $S_{5b}$ for 32CH operation; (b) $S_{1b}$, $S_{3b}$ and $S_{5b}$ for 64CH operation; and/or (c) $S_{1b}$, $S_{2b}$, $S_{3b}$, $S_{4b}$ and $S_{5b}$ for 128CH operation.

In another embodiment, the apparatus 1400 may operate in 64CH mode using only the odd elements in EG1 to EG4. Operation is similar to the 32CH version where both $S_{na}$ and $S_{nb}$ are used, with $S_{na}$ used for the left (top) half of the data sub bands and $S_{nb}$ used for the right (bottom) half of the data sub bands. Various options may include using servos from (a) SG1 and SG5; (b) SG1, SG3 and SG5; (c) SG1, SG2, SG3, SG4 and SG5.

Various embodiments includes the apparatus 1400 configured for 32-, 64-, and 128-channel channel operation. The configuration of the apparatus 1400 generally corresponds to that shown in FIG. 14, as described above. As an option, the embodiments of the apparatus 1400 described below may be implemented in conjunction with features from any other embodiment listed herein, such as those described with reference to the other FIGS. Of course, however, such apparatus 1400 and others presented herein may be used in various applications and/or in permutations which may or may not be specifically described in the illustrative embodiments listed herein. Further, the apparatus 1400 presented herein may be used in any desired environment.

The apparatus 1400 includes a first group EG1 of evenly-spaced elements E1-E32, the first group having a number $(N_E)=32$ of the elements including at least a first element E1, a last element E32, and a second-to-last element E32 of the first group.

A second group EG2 of evenly-spaced elements E33-E64 is adjacent the first group and extends along a longitudinal axis of the first group. The second group has $N_E=32$ of the elements including at least a first element, a last element, and a second-to-last element of the second group. A third group EG3 of evenly-spaced elements E65-E96 is adjacent the second group and extend along a longitudinal axis of the first group. The third group has $N_E=32$ of the elements including at least a first element, a last element, and a second-to-last element of the third group. A fourth group EG4 of evenly-spaced elements E97-E128 is adjacent the third group and extends along the longitudinal axis of the first group, the fourth group having $N_E=32$ of the elements including at least a first element, a last element, and a second-to-last element of the fourth group.

The elements of all groups EG1-EF5 are spaced by an element pitch ($W_{EPo}$) in the respective group (as measured in a similar manner to that shown in FIG. 13, see also definitions below).

The apparatus 1400 of FIG. 14 also includes a plurality of servos S1a-S5b, comprising at least a first, second, third, fourth, fifth, sixth, seventh, eighth, ninth, and tenth servo. The third and fourth servos S2a, S2B are positioned between the first and second groups, the fifth and sixth servos are positioned between the second and third groups, the seventh and eight servos are positioned between the third and fourth groups.

The first element E1 in the first group and the first servo Sla are separated by a first distance ($W_{SE.Long}$) (as measured in a similar manner to that shown in FIG. 13, see also definitions below). The first element in the second group and the third servo are separated by the first distance ($W_{SE.Long}$). The first element in the third group and the fifth servo are separated by the first distance ($W_{SE.Long}$). The first element in the fourth group and the seventh servo are separated by a first distance ($W_{SE.Long}$). The second-to-last element in the first group and the fourth servo are separated by the first distance ($W_{SE.Long}$). The second-to-last element in the second group and the sixth servo are separated by the first distance ($W_{SE.Long}$). The second-to-last element in the third group and the eighth servo are separated by the first distance ($W_{SE.Long}$). The second-to-last element in the fourth group and the tenth servo are separated by the first distance ($W_{SE.Long}$).

The first element in the first group and the second servo are separated by a second distance ($W_{SE.Short}$) (as measured in a similar manner to that shown in FIG. 13, see also definitions below). The first element in the second group and the fourth servo are separated by the second distance ($W_{SE.Short}$). The first element in the third group and the sixth servo are separated by the second distance ($W_{SE.Short}$). The first element in the fourth group and the eighth servo are separated by the second distance ($W_{SE.Short}$). The second-to-last element in the first group and the third servo are separate by the second distance ($W_{SE.Short}$). The second-to-last element in the second group and the fifth servo are separate by the second distance ($W_{SE.Short}$). The second-to-last element in the third group and the seventh servo are separate by the second distance ($W_{SE.Short}$). The second-to-last element in the fourth group and the ninth servo are separate by the second distance ($W_{SE.Short}$).

The first servo and the third servo are separated by a third distance equal to $2 \cdot W_{SE.Short}+(N_E-1) \cdot W_{EP64}$, wherein $W_{EP64} \equiv W_{EPo}$. The second servo and the fourth servo are separated by the third distance. The third servo and the fifth servo are separated by the third distance. The fourth servo and the sixth servo are separated by the third distance. The fifth servo and the seventh servo are separated by the third distance. The sixth servo and the eighth servo are separated by the third distance. The seventh servo and the ninth servo are separated by the third distance. The eighth servo and the tenth servo are separated by the third distance.

In one embodiment, the apparatus is configured to operate on a magnetic recording tape having a plurality of servo bands, the servo bands being separated by a distance equal to the third distance.

In one embodiment, the apparatus is configured to operate on a magnetic recording tape having a plurality of servo bands, the servo bands being separated by a distance that is less than the third distance. Such formatting is useful when the array of elements and servos is nominally tilted, e.g., for compensating for known types of tape dimensional stability (TDS) such as tape lateral expansion and contraction.

In one embodiment, all of the elements in the groups are data readers or data writers.

In one embodiment, the elements are symmetrical about a center line positioned between the second and third groups.

The apparatus, in various embodiments, may include a drive mechanism for passing a magnetic recording tape over a magnetic head having the groups of elements, and a controller electrically coupled to the elements.

In one embodiment, $W_{EP64}=46.635$ μm±10% and the magnetic head is operated with a 10 degree tilt.

In one embodiment, $W_{SE.Short}=51.690$ μm±10% and the magnetic head is operated with a 10 degree tilt.

In one embodiment, the apparatus is configured to selectively perform 32-channel operation using one of the groups, 64-channel operation using two of the groups, and 128-channel operation using four of the groups.

There have thus been described several embodiments of illustrative head layouts with reference to FIGS. 11-14. Table 1 summarizes some of these embodiments.

Head Definitions $N_E$ Number of elements in an element group.

$W_{EP}$ Element pitch for all elements $W_{EPOE}$ Element pitch using only odd elements: $W_{EPOE}=W_{EP}/2$ $W_{SE}$ Single Servo per SB: Distance from single servo to nearest element in a group $W_{SE.Long}$ Dual Servo per SB: Distance from $S_{1a}$ to $E_1$ (of Group 1) and $S_{2b}$ to last element in group 1

$W_{SE.Short}$ Dual Servo per SB: Distance from $S_{1b}$ to $E_1$ (of Group 1) and $S_{2a}$ to last element in group 1

$W_{Span}$ Distance from servo in $SG_n$ to $SG_{n+1}$ (eg $S_{1a}$ to $S_{2a}$ or $S_{1b}$ to $S_{2b}$)

Media Definitions $N_{DB}$ Number of Media Data Bands $N_{SB}$ Number of Media Servo Bands $W_{Tape}$ Width of tape $W_{Edge}$ buffer on either end of the tape. No servo pattern or data is written in this region $W_{SBG}$ Buffer on either side of a servo band. Avoid writing servo pattern or data here $W_{DBG}$ Buffer on either side of a data band. Avoid writing servo pattern or data here $W_{SB}$ Width of servo band $W_{DB}$ Width of data band $W_{DSB}$ Width of data sub band ($W_{DB}=W_{EP}$)

$W_{InBuf}$ Buffer in middle of data sub band $W_{outBuf}$ Buffer in on outer edge of data sub band. Half on "Top" and half on "bottom" edge

TABLE 1

| Options for different track options | | | | | | | | | | |
|---|---|---|---|---|---|---|---|---|---|---|
| Option Design | Tracks | SG1 | EG1 | SG2 | EG2 | SG3 | EG3 | SG4 | EG4 | SG5 |
| D1 | 128 | S1a, S1b | 32 | S2a, S2b | 32 | S3a, S3b | 32 | S4aS4b | 32 | S5a, S5b |
| O1 | 128 | S1b | 32 | S2b | 32 | S3b | 32 | S4b | 32 | S5b |
| O2 | 64 | x | x | S2b | 32 | S3b | 32 | S4b | x | x |
| O3 | 64 | s1a, S1b | 16 | s2a, S2b | 16 | s3a, S3b | 16 | s4a, S4b | 16 | s5a, S5b |
| O4 | 32 | x | x | s2a, S2b | 16 | s3a, S3b | 16 | s4a, S4b | x | x |
| D2 | 64 | s1a, S1b | 16 | s2a, S2b | 16 | s3a, S3b | 16 | s4a, S4b | 16 | s5a, S5b |
| O3 | 64 | s1a, S1b | 16 | s2a, S2b | 16 | s3a, S3b | 16 | s4a, S4b | 16 | s5a, S5b |
| O4 | 32 | x | x | s2a, S2b | 16 | s3a, S3b | 16 | s4a, S4b | x | x |
| D3 | 64 | x | x | s2a, S2b | 32 | s3a, S3b | 32 | s4a, S4b | x | x |
| O2 | 64 | x | x | S2b | 32 | S3b | 32 | S4b | x | x |
| O4 | 32 | x | x | s2a, S2b | 16 | s3a, S3b | 16 | s4a, S4b | x | x |

Three wafer designs are shown, D1, D2 and D3 and four options, O1-O4 are shown. Design D1 may be used to provide O1-O4, and/or each of the options may be provided by a standalone head. Design D2 is a subset of design D1 and can be used to provide options O3 and O4. Design D3 is a subset of design D1 and can be used to provide options O2 and O4. In use, the drive can choose not to operate with all servo groups, but in some approaches may use all of the servos. Option O1 or O3 could function using only servos from SG1 and SG5 or only servos from SG1, SG3 and SG5 or servos from all 5 groups SG1 to SG5. Option O2 or O4 could function using only servos from SG2 and SG4 or using servos from all three groups SG2, SG3 and SG4. In various approaches, the minimum number of servo groups is present, which could be the outer SGs for each design. The optimum configuration has all SGs in the particular design.

Explanation of the Dimensions

This section describes the calculation of the design dimensions. The following definitions are used:

Description of Determining Head Parameters for Optimization

FIG. 15A shows various regions on a magnetic recording tape 1500. FIG. 15A shows four (4) data bands, DB, and five (5) servo bands, SB. FIG. 15B shows various regions on a magnetic recording tape 1500 with eight (8) DBs and nine (9) SBs. As an option, the magnetic recording tape 1500 described may be implemented in conjunction with features from any other embodiment listed herein, such as those described with reference to the other FIGS. Of course, however, such magnetic recording tape 1500 and others presented herein may be used in various applications and/or in permutations which may or may not be specifically described in the illustrative embodiments listed herein. Further, the magnetic recording tape 1500 presented herein may be used in any desired environment.

The longitudinal axis 1502 of the tape 1500 extends up and down, and the various regions are shown for a portion of the tape between opposite lateral edges 1504. Two edge guard bands, each of width $W_{Edge}$, are shown in FIGS. 15A and 15B, one on either end of the tape 1500. No magnetic information is written in these regions. FIG. 15A is a four-data-band tape format ($N_{DB}$=4), labeled DB$_1$ to DB$_4$, each of width $W_{DB}$; and five servo bands, labeled SB$_1$ to SB$_5$, and each of width $W_{SB}$. FIG. 15B is an eight-data-band tape format ($N_{DB}$=8), labeled DB$_1$ to DB$_8$, each of width $W_{DB}$; and nine servo bands, labeled SB$_1$ to SB$_9$, and each of width $W_{SB}$. The servos are designed to span the servo band while writing data within each data band. A buffer is located at either end of a data band (Data Band Guard) of width $W_{DBG}$ and on either end of the servo band (Servo Band Guard) of width $W_{SBG}$. The width of tape is given by:

$$W_{Tape}=2 \cdot W_{Edge}+N_{DB} \cdot (W_{DB}+2 \cdot W_{DBG})+(N_{DB}+1) \cdot (W_{SB}+2 \cdot W_{SBG}) \qquad 1$$

The servo and data band guards act as buffers between the servo bands and the data bands respectively to avoid overwriting these regions. Note that the parameter $W_{DBG}$ is not strictly needed as it can be accounted for by modifying $W_{SBG}$ and $W_{Edge}$. The benefit of $W_{DBG}$ is if one chooses to define media with $W_{SBG}$ for the media and then add a drive protection of $W_{DBG}$, then the media and the head can account for the buffers differently.

$\{W_{SBG2}, W_{Edge2}$ and $W_{DBG2}$=0$\}$ with $W_{SBG2}$=$W_{SBG1}$+$W_{DBG1}$, $W_{Edge2}$=$W_{Edge1}$−$W_{DBG1}$. gives equivalent results to $\{W_{SBG1}, W_{DBG1}, W_{Edge1} \neq 0\}$.

In the description of writing, data is written top-to-bottom of data band for forward or even wraps and bottom-to-top for reverse or odd wraps. Forward and even are interchangeable, as are reverse and odd wraps.

Method to Write Data

The determination of writing process focuses on the Sub Data Bands of FIG. 16.

FIG. 16 is a representative schematic of a Data Band (DB) 1600 and Sub Data Bands, SDB. The data band is surrounded by two Data Guard Bands, each of width, $W_{DBG}$, which acts as buffers between the Data Band and the surrounding Servo Bands. For a tape head with $N_E$ read and $N_E$ write elements and a drive with $N_{CH}$ read/write channels, where $N_E$=$N_{CH}$, the number of sub data bands is $N_E$. On the read and writer modules, the elements (readers or writers) are all separated by an element pitch of width, $W_{EP}$. The width of the Data Band, $W_{DB}$, then is given by the number of elements times the element pitch:

$$W_{DB}=N_E \cdot W_{EP}. \qquad 2$$

Each SDB has an outer buffer on either end with the width, $W_{OutBuf}/2$. The data is written from the top of the SDB to the center on forward wraps and from the bottom of the SDB to the center on reverse wraps. An Inner Buffer of width, $W_{InBuf}$, separates the last forward track from the last reverse track.

A total of $N_{trk}$ Wraps (or tracks) will be written. Half will be in the even (forward) wraps and half will be in the odd (reverse) wraps. In this document, even and forward are interchangeable as are odd and reverse. Forward and reverse simply indicate directions of tape motion. These terms are also interchangeable in practice. For the first even wrap, the Writer top edge abuts the lower edge of the top Outer Buffer. The data is shingled to a Track Pitch width, $W_{TP}$. The width of the Even Wrap data region within the SDB will be $W_{TP} \cdot N_{trk}/2$. So, the writer will move a distance, $W_{mv}$, given by:

$$W_{mv} = \left( \frac{N_{trk}}{2} - 1 \right) \cdot W_{TP}. \qquad 3$$

An Inner Buffer of width $W_{InBuf}$ is located between the Even and Odd Wraps region to ensure that the data is not overwritten by the last Even or Odd Written track. The bottom of the final shingled track for the Even Wraps abuts the top of the Inner Buffer. For the first Odd Wrap, the bottom of the writer abuts the top of the Outer Buffer at the bottom of the SDB. For the final Odd Wrap, the top of the writer will be positioned at or slightly below the bottom of the Inner Buffer. This is to ensure that no data is overwritten. The width of the final Odd Wrap will then be the width of the Writer as it is not shingled. The Data Sub Band width is the Element Pitch, which is calculated using Equation 4a:

$$W_{EP}=(N_{TrkR}-1) \cdot W_{TP}+W_W+W_{OutBuf}+W_{InBuf}. \qquad 4a$$

Solving for $N_{TrkR}$ gives:

$$N_{TrkR} = \frac{W_{EP} - W_W - W_{InBuf} - W_{OutBuf} + W_{TP}}{W_{TP}} \qquad 4b$$

$N_{TrkR}$ is a real number. Physically, the number of Wraps an integer, $N_{Trk}$. Since the number of Even and Odd wraps is the same, $N_{Trk}$ is and even integer:

$$\text{and } N_{Trk}=2 \cdot \text{float}(N_{TrkR}/2), \qquad 4c$$

or $$N_{Trk} = 2 \cdot \text{floor} \left( \frac{W_{EP} - W_W - W_{InBuf} - W_{OutBuf} + W_{TP}}{2 \cdot W_{TP}} \right). \qquad 4d$$

floor(x) is the mathematical function which rounds down to the nearest integer.

Since the buffers are much smaller than $W_{EP}$ and $W_W$, $N_{Trk}$ is primarily given by $W_{EP}$−$W_W$, so the wider the writer, the lower the capacity.

$$N_{Trk} \sim \frac{W_{EP} - W_W}{W_{TP}} + 1 \qquad 4e$$

The next step is to determine the required width of the servo bands. Two options for servos will be discussed. The simplest is a single servo in each Servo Band (Single Servo Option). The second is using two separate servos, one to write the Even Wraps and a second to write the Odd Wraps (Dual Servo Option). The two will be discussed below.

Single Servo Option for $N_E$=$N_{CH}$.

FIG. 17 is a schematic of two Servo Bands surrounding one Sub Data Band in the case where $N_E$=$N_{CH}$=1. The concept can be expanded to any case where $N_E$=$N_{CH}$. FIG. 17 is sufficient to determine the servo-to-nearest element distance ($W_{SE}$ in FIG. 17) or the servo band width, $W_{SB}$, in FIG. 18 is sufficient for any $N_E$. For $N_E$>1, the length of the Data Band Region is $W_{DB}$, given by Equation 10. Shown are the Top and Bottom servo bands with the servo guard band, the data guard bands, the data guard bands between the servo bands and the data band. Only a single SDB is shown since this is pictorially easier than showing all SDBs. For determining the required servo band width, and the separation between the servos and the nearest element, etc., this diagram is sufficient.

Using a single Servo when the number of channels is equal to the number of elements, $N_{CH}=N_E$, the width of the Servo Band and the distance between the Servo and the nearest element, $W_{SE.EvenNE}$, (simply $W_{SE}$ in FIG. 17), can be explained using FIG. 17. The subscript "SE" indicates servo-to-element, and "EvenNE" indicates $N_E$ is an even number. Since the center of the reader is $$\frac{W_{TP} + W_{OutBuff}}{2}$$

from the top of the SDB for the $1^{st}$ Even Read wrap and from the bottom of the SDB for the $1^{st}$ Odd Read wrap, the Reader will move a distance:

$$W_{mv.R}=W_{EP}-W_{TP}-W_{outBuff}. \quad 5a$$

The Servo moves the same distance. The top edge of the servo abuts the top of the SB for the $1^{st}$ Even Read wrap and the bottom edge of the servo abuts the bottom edge of the SB for the $1^{st}$ Odd wrap so the center of the servo will be $$\frac{W_s}{2}$$

from the top and bottom edge of the SB for the $1^{st}$ Even and Odd wraps respectively. $W_S$ is the Servo width. Thus, the width of the Servo band will be:

$$W_{SB} = w_{mv.R} + 2 \cdot \frac{W_S}{2} = W_{EP} + W_S - W_{TP} - W_{OutBuff}. \quad 5b$$

$W_{TP}$ and $W_{OutBuff}$ are much smaller than $W_{EP}$ and $W_S$, so an approximation of $W_{SB}$ is:

$$W_{SB}\sim W_{EP}+W_S. \quad 5c$$

The distance between the center of the Top Servo and the center of the first $1^{st}$ Reader can be determined viewing FIG. 17 for the $1^{st}$ Even Read with the distance $W_{SE}$:

$$W_{SE} = W_{SB} - \frac{W_S}{2} + W_{SBG} + W_{DBG} + \frac{W_{OutBuff}}{2} + \frac{W_{TP}}{2}. \quad 6a$$

Combining 4b with 5a yields:

$$W_{SE} = W_{EP} + \frac{W_S - W_{TP} - W_{OutBuff}}{2} + W_{SBG} + W_{DBG}. \quad 6b$$

By symmetry, the distance from the Lower Servo to the last Reader will also be given by Equation 5b. Note that the actual width of the Data band is given by Equation 2 for $N_E$ Elements, but for explanation purposes a single SDB is sufficient and easier to show pictorially.

Equation 1 gives $W_{Tape}$ as a function of unknowns $W_{DB}$ and $W_{SB}$; Equations 2 and 5b respectively give $W_{DB}$ and $W_{SB}$ as a function of $W_{EP}$. Combining Equations 1, 2 and 5b solve for $W_{EP}$:

$$W_{EP} = \frac{W_{Tape} - 2 \cdot W_{Edge} - 2 \cdot N_{DB} \cdot W_{DBG} - (N_{DB} + 1) \cdot (W_S - W_{TP} - W_{OutBuff} + 2 \cdot W_{SBG})}{(N_{DB} \cdot N_E + N_{DB} + 1)}. \quad 7a$$

An approximation for $W_{EP}$ is:

$$W_{EP} \sim \frac{W_{Tape} - 2 \cdot W_{Edge}}{(N_{DB} \cdot N_E + N_{DB} + 1)}. \quad 7b$$

Error in 6b is ~300 nm.
$W_{SB}$ can be determined using Equation 5b using the value for $W_{EP}$ from Equation 7a.
The Servo-to-Servo span, $W_{ServoSpan.Even}$, is given by:

$$W_{ServoSpan.Even}=2\cdot W_{SE.EvenNE}+(N_E-1)\cdot W_{EP}. \quad 7a$$

$$W_{ServoSpan.Even}=(N_E+1)\cdot W_{EP}+W_S-W_{TP}-W_{OutBuff}+2\cdot(W_{SBG}+W_{DBG}). \quad 7b$$

Thus, $W_{ServoSpan.Even}\sim(N_E+1)\cdot W_{EP}+WS. \quad 7c$

Dual Servo Option for $N_E=N_{CH}$.

FIG. 18 shows a schematic of an array 1800 across a single data band with dual servos per servo band, and particularly, one element group and two servo groups having two servos per servo band. The Elements, E.1 to E.N$_E$ can be either a group of $N_E$ Readers, R.1 to R.N$_E$, or Writers, W.1 to W.N$_E$. The servos work in pairs: {S1a and S2a} for Forward or {S1b and S2b} for Reverse Reading and/or Writing. FIGS. 19A and 19B are schematics of two Servo Bands surrounding a single Sub Data Band, SDB, for (FIG. 19A) Forward and (FIG. 19B) Reverse Writing and Reading. As will be shown later, the distance from one of each Servo pair to the nearest element will be $W_{SE.Short}$ while the $2^{nd}$ Servo in the pair will have a distance $W_{SE.Long}$, with the subscript "SE" revering to Servo-to-Element and the subscripts "Short" and "Long" for relative distance. The concept can be expanded include any number of SDBs. FIGS. 19A and 19B are sufficient to determine the distances from a servo to the nearest element and the servo band width.

The positioning of the servos will now be described with reference to FIGS. 19A-19B. FIG. 19A is a schematic of Servo Bands around a single Sub Data Band for Forward Writing and Reading with Servos $S_{1b}$ and $S_{2b}$. FIG. 19B is a schematic of Servo Bands around a single Sub Data Band for Reverse Writing and Reading with Servos $S_{1b}$ and $S_{2b}$.

Focusing on FIG. 19A for the Forward Wraps, $S_{1b}$ will span the Top Servo Band and $S_{2b}$ will span the Bottom Servo Band. The distance between the center of the Top Servo and the center of the first Reader can be determined as follows: The highest location of the Servo is during first Forward Read wrap. The top edge of the Top Servo will abut the lower edge of the Top Servo Band and the Readers will be located half a Track Pitch below the top Outer Buffer. Thus, the distance from the Top Servo, $S_{1b}$, to the $1^{st}$ Reader, $(E_1$ in FIG. 19A), is $W_{SE.Short}$, and is given as:

$$W_{SE.Short} = W_{SB} - \frac{W_s}{2} + W_{SBG} + W_{DBG} + \frac{W_{OutBuff}}{2} + \frac{W_{TP}}{2}. \quad 8$$

This is the same Equation as used for the Single Servo option, but $W_{SB}$ will be different as shown below. Here is where the difference occurs. For the first Forward Wrap, the top edge of the servo used in the lower Servo Band will abutt the lower edge of the top Servo Band Guard in that Servo Band (ie Top edge of the bottom servo band in FIG. 19A). The separation from the last Reader, $E_{NE}$, to the lower servo, $S_{2b}$, is labeled $W_{SE.Long}$.

$$W_{SE.Long} = W_{EP} - \frac{W_{OuterBuff}}{2} - \frac{W_{TP}}{2} + W_{DBG} + W_{SBG} + \frac{W_S}{2}. \qquad 9$$

The primary dimension determining the distance between the servo and the closest Read Element is $W_{SB}$ for $W_{SE.Short}$ and $W_{EP}$ for $W_{SE.Long}$. Since each pair of Servos only spans half the Data Band for the Even wraps, $W_{SB} \sim W_{EP}/2$, as will be described below.

The Odd Wraps will also use a pair of Servos, and by symmetry, they will have the same dimensions as the Even Wraps, except they will be reversed, with $S_{SE.Long}$ (with $W_{SE.Long}$) being in the Top Servo Band and $W_{SE.Short}$ being in the Bottom Servo Band. Thus, the order of elements from Top to Bottom will be: $S_{Long}$, $S_{Short}$, $N_E$ elements, $S_{Short}$, $S_{Long}$, or in FIG. 18: $S_{1a}$, $S_{1b}$, $N_E$ elements, $S_{2a}$, $S_{2b}$. The Servo Span, or distance from the Top Servo to the Bottom Servo is then:

$$W_{ServoSpan.Even2S} = W_{SE.Short} + W_{SE.Long} + (N_E - 1) \cdot W_{EP}. \qquad 10$$

The reverse wraps, shown in FIG. 19B, are similarly analyzed with the same results.

The next step is to determine the length of the Servo Band. Observing FIG. 19A, the top of the Servo band is a distance $$\frac{W_S}{2}$$

above the center of $S_{1b}$ positioned for the first Forward Read Wrap. For the first Forward Write Wrap, the Writers are positioned so the top edge of the Writer abuts the lower edge of the top Outer Buffer region (width $W_{OutBuf}/2$). For the first Forward Wrap, the distance between the center of the Writer and Reader is $W_{w2ROffset}$:

$$W_{w2ROffset} = (W_W - W_{TP})/2. \qquad 11$$

The Writer then will write $N_{trk}$ Wraps, stepping a distance $W_{TP}$ per Wrap (see FIGS. 17 and 19A). The distance moved, $W_{mv}$, is then:

$$W_{mv} = \left(\frac{N_{Trk}}{2} - 1\right) \cdot W_{TP}. \qquad 12$$

The lower edge of the servo will abut the top of the lower Servo Band Guard, which is $$\frac{W_S}{2}$$

below the center of the servo. The Servo Band width, $W_{SB}$, is given by the sum of the terms described above.

$$W_{SB} = \frac{W_S}{2} + W_{W2ROffset} + W_{mv} + \frac{W_S}{2}. \qquad 13a$$

Combining Equations 11, 12 and 13a gives:

$$W_{SB} = W_S + \left(\frac{N_{Trk}}{2} - 1\right) \cdot W_{TP} + \frac{W_W - W_{TP}}{2}. \qquad 13b$$

Substituting 4b into 13b (using $N_{Trk}$ for $N_{TrkR}$ from 4b) yields $W_{SB}$ in terms of $W_{EP}$:

$$W_{SB} = \frac{W_{EP} - W_{OutBuf} - W_{InBuf}}{2} + W_S - W_{TP}. \qquad 13c$$

To first order $$W_{SB} \sim \frac{W_{EP}}{2} + W_S - W_{TP}. \qquad 13d$$

Or to within the width of $W_S$:

$$W_{SB} \sim \frac{W_{EP}}{2}. \qquad 13e$$

The final dimension needed is $W_{EP}$, which is solved using Equation 1 for $W_{Tape}$, which contains the dimensions $W_{DB}$ (Equation 2) and $W_{SB}$ (Equation 13c):

$$W_{EP} = \left( \frac{W_{Tape} - 2 \cdot W_{Edge} - 2 \cdot N_{DB} \cdot W_{DBG} - (N_{DB} + 1) \cdot \left(W_S + 2 \cdot W_{SBG} - W_{TP} + (W_{OutBuf} - W_{InBuf})/2\right)}{\left(N_W \cdot N_{DB} + \frac{(N_{DB} + 1)}{2}\right)} \right). \qquad 14$$

The optimum choice of Element Pitch, $W_{EP}$, is then determined using the Tape input values of Tape Width $W_{Tape}$, Edge Guard Band width $W_{Edge}$, Number of Data Bands $N_{DB}$, and the head/drive parameter of the number of Elements $N_E$ and the Servo Band Guard $W_{SBG}$ and Data Band Guard $W_{SBG}$ and the Outter and Inner Buffers $W_{OutBuf}$ and $W_{InBuf}$ chosen for drive operation. To first order, $W_{EP}$ is:

$$W_{EP} \sim \frac{W_{Tape} - 2 \cdot W_{Edge}}{N_E \cdot N_{DB} + \frac{(N_{DB} + 1)}{2}}, \qquad 15a$$

$W_{EP}$ can be further approximated with a loss of ~1% in accuracy as:

$$W_{EP} \sim \frac{W_{Tape} - 2 \cdot W_{Edge}}{N_E \cdot N_{DB}}, \qquad 15b$$

Which, to first order, is the used portion of tape ($W_{Tape} - 2 \cdot W_{Edge}$) divided by the total number of Sub Data Bands ($N_E \cdot N_{DB}$).

When all $N_E$ elements are used, the element pitch is $W_{EP_O}$ and only servos $S_{nb}$ are used. The distance between servos, $S_{1b}$ and $S_{2b}$ is termed $W_{Span}$, (see FIG. 13C) whose value is:

$$W_{Span} = 2 \cdot W_{SE.Short} + (N_E - 1) \cdot W_{EP_O}. \qquad 16a$$

When half the $N_E$ elements, $$\frac{N_E}{2},$$

are used for half the channels, the element pitch, $W_{EPd}$, is 2 times $W_{EPo}$ (see FIG. 13B):

$$W_{EPd}=2 \cdot W_{EPo} \qquad \text{16b}$$

The distance, $W_{Span}$, between servos, $S_{1b}$ and $S_{2b}$ is given as (see FIG. 13B):

$$W_{Span} = W_{SE\text{-}Short} + W_{SE\text{-}Long} + \left(\frac{N_E}{2} + 1\right) \cdot 2 \cdot W_{EPo}. \qquad \text{16c}$$

Combining 16a and 16c with 16b yields:

$$W_{SE\text{-}Long} = W_{SE\text{-}Short} + W_{EPo} = \frac{W_{EPd}}{2}. \qquad \text{16d}$$

This can be verified rewriting Equations 8 and 9 for $W_{SE.Long}$ $W_{SE.Short}$ and respectively. Substituting Equation 13c for into Equation 8 yields $W_{SE.Short}$:

$$W_{SE\text{-}Short} = \frac{W_{EPd} - W_{InBuf}}{2} + W_{SBG} + W_{DBG} + \frac{W_S}{2} - \frac{W_{TP}}{2}. \qquad \text{17a}$$

$$W_{SE\text{-}Long} = \frac{W_{EPd}}{2} + \frac{W_{EPd} - W_{OutBuf}}{2} + W_{DBG} + W_{SBG} + \frac{W_S}{2} - \frac{W_{TP}}{2}. \qquad \text{17b}$$

Rearranging this gives:

$$W_{SE\text{-}Long} = W_{SE\text{-}Short} + \frac{W_{EPd}}{2} + \frac{W_{InBuf} - W_{OutBuf}}{2}. \qquad \text{17c}$$

If $W_{InBuf}=W_{OutBuf}$, then 17c agrees with 16d. both $W_{InBuf}$ and $W_{OutBuf}$ are $<<W_{EPd}$, and are also close in values, so 16d and 17c essentially agree.

Tilted Head for Tape Dimensional Stability Compensation. In writing data to tape with a multi-Element Read/Write head, the spacing between elements can increase or decrease due to changes in spacing on the head or in the media. Expansion or contraction of the head or media width due to thermal or humidity or other stresses can occur. One means of correcting for these changes is to tilt the head at an angle relative to the track direction. FIG. 20 shows the concept pictorially using a simplified array 2000. For example, if the media moves in the x direction and the track pitch is in the y direction, rotating the head by an angle q relative to the y axis will shorten the track pitch in the frame of the tape. The head can be built with a fixed value of 0, and active compensation of the angle about the center can be done. The analysis given so far can be generalized to include the head tilt concept by analyzing the dimensions in the reference of the media. Thus, the media dimensions, $d_{media}$, are fixed and the head dimensions, $d_{head}$, are translated to the media reference plane by multiplying by cos (00). The calculations for the head dimensions for parameter X, $W_{X.Head}$, are then done in the reference plane of the media as transformed dimensions, $W_{X.Tape}$:

$$W_{X.Tape}=\cos(\theta_o) \cdot W_{X.Head} \qquad \text{18a}$$

And vice versa with:

$$W_{X\text{-}Head} = \frac{W_{X\text{-}Tape}}{\cos(\theta_o)} \qquad \text{18b}$$

Media parameters include: $W_{Tape}$, $W_{Edge}$, $W_{DB}$, $W_{DBG}$, $W_{SB}$, $W_{SBG}$, $W_{OutBuf}$, $W_{InBuf}$ and $W_{TP}$.

Head parameters include: $W_S$, $W_W$, $W_R$, $W_{EP}$, $W_{SE.Long}$ and $W_{SE.Short}$.

Equations 1 to 17 are all modified by converting the head parameters: $W_S$, $W_W$, and $W_R$ into their dimensions on tape using Equation 18a. The element pitch in the tape reference plane, $W_{EP.Tape}$, is then calculated from Equation 14 using Equation 18a for converting $W_S$ into the tape reference plane.

$$W_{EP\text{-}Tape} = \left(\frac{W_{Tape} - 2 \cdot W_{Edge} - (N_{DB} + 1) \cdot \left(W_S \cdot \cos(\theta_o) + 2 \cdot W_{SBG} - W_{TP} + (W_{OutBuf} - W_{InBuf})/2\right)}{\left(N_E \cdot N_{DB} + \frac{(N_{DB} + 1)}{2}\right)}\right). \qquad 19$$

The head element pitch is then calculated by converting $W_{EP.Tape}$ into the value on the head using 18b. $W_{SE.Long}$ and $W_{SE.Short}$ are respectively modified from Equations 9 and 17a to be:

$$W_{SE\text{-}Long\text{-}Tape} = W_{EP\text{-}Tape} - \frac{W_{OuterBuf}}{2} - \frac{W_{TP}}{2} + W_{DBG} + W_{SBG} + \frac{W_{S.Tape}}{2}. \qquad \text{20a}$$

$$W_{SE\text{-}Short\text{-}Tape} = \frac{W_{EPd\text{-}Tape} - W_{InBuf}}{2} + W_{SBG} + W_{SBG} + \frac{W_{S\text{-}Tape}}{2} - \frac{W_{TP}}{2}. \qquad \text{17a}$$

Additional features enabled by the simplified array 2000 of FIG. 20 are as follows:

With Tilted Head rotation angle, $\theta$, the Head Span, $W_{HS}$, Element Pitch, $W_{EP}$, and Servo-to-Element Separation, $W_{SE}$, all need to increase from their values calculated with a 0-degree rotation angle, $W_{X.Cut}$.

$$W_{X\_Bead} = \frac{W_{X\_Cal}}{\cos(\theta)}$$

For Pisa angle, calculate in the tape width reference frame
1. Multiply wafer dimensions $W_W$, and $W_a$ by $\cos(\Theta)$
2. Calculate $W_{X\_Cat}(W_{EP}, W_{SB}, W_{UB}, W_{SEShort}, W_{SELong})$ in the tape width reference width
3. Multiply ($W_{EP}, W_{SE}, W_{DB}, W_{SEShort}, W_{SELong}$) by $1/\cos(\Theta)$ to revert to the module width, $W_{X\_Head}$ Head Assembly/Alignment, 2-Band Head and Dual Servo Option A 2-Band Head is one where the elements span two bands, half the Elements are in one band and the other half are in an adjacent band, with 3 groups of servos in 3 Servo Bands. For a 2-Band Head, the Media must have an even number of Data Bands with data being written to or read from two adjacent data bands simultaneously. The arrangement during Read or Write is: SB, DB, SB, DB, SB.

FIG. 21 is a schematic for a 2-Band Head 2100 with $N_E$ Elements in each Group (A and B) utilizing Dual Servo Option for a 3-module Head alignment with a Left Writer, (LW), a Right Writer, (RW), and Center Reader, (CR). To match FIG. 21 alignment with FIGS. 18 and 19, the picture is rotated 90 degrees clockwise. LW refers to media traveling from Left to Right in FIGS. 18 and 19A-B so LW will be writing and the Center Reader, CR, will be reading Even Wraps (Forward or Fwd.). RW refers to media traveling from Right to Left in FIGS. 18 and 19A-19B so RW will be writing and the Center Reader, CR, will be reading Odd Wraps (Reverse or Rev.). S Servos, $S_{nb}$, will be used for Even (Forward) Wraps and T Servos, $S_{na}$, for Odd (Reverse) Wraps (or vice versa).

As described earlier, a 3-module head is not the only functional design for a linear tape product. One could also build a 2-module head which has both Readers and Writers on each module.

Because of the cost of a wafer and Servo writer for the media, a general design is often reused for several generations. The head design of Element Pitch and Servo locations remain fixed and only parameters such as Reader and Writer widths and track pitch are changed to achieve higher capacity. The media servo pattern locations and widths remain unchanged, only modifying the media properties such as magnetic layers, surface roughness, substrate thickness and length needed for higher capacity.

The change in the optimum Element Pitch is not affected by the writer width.

$$\frac{\partial W_{EP}}{\partial W_W} = \frac{\partial W_{SE\cdot Long}}{\partial W_W} = \frac{\partial W_{SE\cdot Short}}{\partial W_W} = 0 \qquad 30$$

The dependence on optimized $W_{EP}$ and a change in $W_{TP}$ is given by:

$$\frac{\partial W_{EP}}{\partial W_{TP}} = \frac{(N_{DB}+1)}{\left(N_E \cdot N_{DB} + \frac{(N_{DB}+1)}{2}\right)} \sim 1/N_E \qquad 31$$

For $N_E$=64 and $W_{TP}$ changing from 500 to 200 nm, the change in the optimum $W_{EP}$ is only 4.7 nm. By using a design calculated for a fixed $W_{TP}$ of say 350 nm to optimize for track pitches ranging from 500 to 200 nm, the head will function for the full range with minor or no reduction in the capacity ($N_{trk}$) for a $W_{TP}$ other than 350 nm.

The change in $W_{SE\cdot Long}$ and $W_{SE\cdot Short}$ with changes in $W_{TP}$ are given here:

$$\frac{\partial W_{SE\cdot Long}}{\partial W_{TP}} = \frac{\partial W_{SE\cdot Short}}{\partial W_{TP}} = -0.5 \text{ nm/nm} \qquad 32$$

A change in $W_{TP}$ by ±200 nm will change the optimum $W_{SE\cdot Long}$ and $W_{SE\cdot Short}$ by ±100 nm, which is minimal with buffers of 1 mm or more. By using a design calculated for a fixed $W_{TP}$ of $W_{TP\cdot Nom}$=200 nm, the head will function for the full range with minor or no reduction in the capacity ($N_{trk}$) for $W_{TP}$ between about 0 and 400 nm or more. Since the design will be for a given media, the locations and sizes of the servo patterns remain unchanged resulting in only minor or no reduction in the capacity achieved compared to the optimum.

Head Design

Extant Reader and Writer Tape heads are developed by depositing material onto a ceramic substrate. The deposition is built vertically. For a ringed writer, the first pole deposited is termed P1 and the latter deposited pole is P2. From the tape bearing surface, TBS, one sees the outline of P1, a Gap of non-magnetic material and P2.

FIG. 22 is a schematic of a 1-Band Head 2200 with $N_E$ Elements utilizing Dual Servo Option for a 3-module Head alignment with a Left (LW) and Right (RW) Writer and Center Reader (CR). As an option, the present head 2200 may be implemented in conjunction with features from any other embodiment listed herein, such as those described with reference to the other FIGS. Of course, however, such head 2200 and others presented herein may be used in various applications and/or in permutations which may or may not be specifically described in the illustrative embodiments listed herein. Further, the head 2200 presented herein may be used in any desired environment.

The LW and RW respectively write while Media moving from Left-to-Right and Right-to-Left. (a) Writer pole P2 is the trailing edge; (b) Writer pole P1 is the trailing edge. Because of processing constraints, the geometry of P1 and P2 are often different. The trailing pole material dominates the quality of the written magnetic bit transition. Because of differences in processing either P1 or P2 trailing could be preferrable. With the symmetric design described in this disclosure, one can use either P1 or P2 trailing without modifying the drive code. Because of the long time and large cost in building wafers and developing drive code, the versatility in enabling either P1 or P2 trailing designs with the same wafer is highly beneficial in time, effort and cost.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A magnetic tape apparatus configured for 32- and 64-channel operation, the apparatus comprising:

a first group of evenly-spaced elements, the first group having a number ($N_E$)=32 of the elements including at least a first element, a last element, and a second-to-last element of the first group;

a second group of evenly-spaced elements adjacent the first group and extending along a longitudinal axis of the first group, the second group having $N_E$=32 of the elements including at least a first element, a last element, and a second-to-last element of the second group; and a plurality of servos, comprising at least a first, second, third, fourth, fifth, and sixth servo, wherein:

the elements of the first group are spaced by an element pitch ($W_{EPo}$), the elements of the second group are spaced by the element pitch ($W_{EPo}$), the third and fourth servos are positioned between the first and second groups, the first element in the first group and the first servo are separated by a first distance ($W_{SE.Long}$), the second-to-last element in the first group and the fourth servo are separated by the first distance ($W_{SE.Long}$), the first element in the second group and the third servo are separated by the first distance ($W_{SE.Long}$), the second-to-last element in the second group and the sixth servo are separated by the first distance ($W_{SE.Long}$), the first element in the first group and the second servo are separated by a second distance ($W_{SE.Short}$), the second-to-last element in the first group and the third servo are separate by the second distance ($W_{SE.Short}$), the last element in the first group and the fourth servo are separate by the second distance ($W_{SE.Short}$), the first element in the second group and the fourth servo are separated by the second distance ($W_{SE.Short}$), the second-to-last element in the second group and the fifth servo are separate by the second distance ($W_{SE.Short}$), the last element in the second group and the sixth servo are separate by the second distance ($W_{SE.Short}$), the first servo and the third servo are separated by a third distance equal to $2 \cdot W_{SE.Short} + (N_E - 1) \cdot W_{EP64}$, wherein $W_{EP64} = W_{EPo}$, the second servo and the fourth servo are separated by the third distance, the third servo and the fifth servo are separated by the third distance, and the fourth servo and the sixth servo are separated by the third distance.

2. An apparatus as recited in claim 1, wherein $W_{SE.Long} = W_{SE.Short} + W_{EP64} = W_{SE.Short} + W_{EP32}/2$, wherein $W_{EP32} = 2 \cdot W_{EPo} = 2 \cdot W_{EP64}$.

3. An apparatus as recited in claim 1, wherein the apparatus is configured to operate on a magnetic recording tape having a plurality of servo bands, the servo bands being separated by a distance equal to the third distance.

4. An apparatus as recited in claim 1, wherein the apparatus is configured to operate on a magnetic recording tape having a plurality of servo bands, the servo bands being separated by a distance that is less than the third distance.

5. An apparatus as recited in claim 1, wherein all of the elements in the groups are data readers or data writers.

6. An apparatus as recited in claim 1, wherein the elements in the groups are symmetrical about a center line positioned between the groups.

7. An apparatus as recited in claim 1, further comprising:

a drive mechanism for passing a magnetic recording tape over a magnetic head having the groups of elements; and a controller electrically coupled to the elements.

8. An apparatus as recited in claim 7, wherein $W_{EP64} = 46.63 \ \mu m \pm 10\%$ and the magnetic head is operated with a 10 degree tilt.

9. An apparatus as recited in claim 7, wherein $W_{SE.Short} = 52.60 \ \mu m \pm 10\%$ and the magnetic head is operated with a 10 degree tilt.

10. An apparatus as recited in claim 7, wherein the apparatus is configured to selectively perform 32-channel operation using only some of the elements of both of the groups and 64-channel operation using all of the elements from both of the groups.

11. An apparatus configured for 32-, 64-, and 128-channel operation, the apparatus comprising:

a first group of evenly-spaced elements, the first group having a number ($N_E$)=16 or 32 of the elements including at least a first element, a last element, and a second-to-last element of the first group;

a second group of evenly-spaced elements adjacent the first group and extending along a longitudinal axis of the first group, the second group having $N_E$=16 or 32 of the elements including at least a first element, a last element, and a second-to-last element of the second group;

a third group of evenly-spaced elements adjacent the second group and extending along a longitudinal axis of the first group, the third group having $N_E$=16 or 32 of the elements including at least a first element, a last element, and a second-to-last element of the third group;

a fourth group of evenly-spaced elements adjacent the third group and extending along a longitudinal axis of the first group, the fourth group having $N_E$=16 or 32 of the elements including at least a first element, a last element, and a second-to-last element of the fourth group; and a plurality of servos, comprising at least a first servo, a second servo, a third servo, a fourth servo, a fifth servo, a sixth servo, a seventh servo, an eighth servo, a ninth servo, and tenth servo, wherein:

the elements of all groups are spaced by an element pitch ($W_{EPo}$) in the respective group, the third and fourth servos are positioned between the first and second groups, the fifth and sixth servos are positioned between the second and third groups, the seventh and eight servos are positioned between the third and fourth groups, the first element in the first group and the first servo are separated by a first distance ($W_{SE.Long}$), the first element in the second group and the third servo are separated by the first distance ($W_{SE.Long}$), the first element in the third group and the fifth servo are separated by the first distance ($W_{SE.Long}$), the first element in the fourth group and the seventh servo are separated by the first distance ($W_{SE.Long}$), the second-to-last element in the first group and the fourth servo are separated by the first distance ($W_{SE.Long}$), the second-to-last element in the second group and the sixth servo are separated by the first distance ($W_{SE.Long}$), the second-to-last element in the third group and the eighth servo are separated by the first distance ($W_{SE.Long}$), the second-to-last element in the fourth group and the tenth servo are separated by the first distance ($W_{SE.Long}$), the first element in the first group and the second servo are separated by a second distance ($W_{SE.Short}$), the first element in the second group and the fourth servo are separated by the second distance ($W_{SE.Short}$), the first element in the third group and the sixth servo are separated by the second distance ($W_{SE.Short}$), the first element in the fourth group and the eighth servo are separated by the second distance ($W_{SE.Short}$), the second-to-last element in the first group and the third servo are separate by the second distance ($W_{SE.Short}$), the second-to-last element in the second group and the fifth servo are separated by the second distance ($W_{SE.Short}$), the second-to-last element in the third group and the seventh servo are separated by the second distance ($W_{SE.Short}$), the second-to-last element in the fourth group and the ninth servo are separate by the second distance ($W_{SE.Short}$), the first servo and the third servo are separated by a third distance equal to $W_{SE.Short}+(N_E-1)\cdot W_{EP64}$, wherein $W_{EP64} \equiv W_{EPo}$, and the second servo and the fourth servo are separated by the third distance, the third servo and the fifth servo are separated by the third distance, the fourth servo and the sixth servo are separated by the third distance, the fifth servo and the seventh servo are separated by the third distance, the sixth servo and the eighth servo are separated by the third distance, the seventh servo and the ninth servo are separated by the third distance, and the eighth servo and the tenth servo are separated by the third distance.

12. An apparatus as recited in claim 11, wherein the apparatus is configured to operate on a magnetic recording tape having a plurality of servo bands, the servo bands being separated by a distance equal to the third distance.

13. An apparatus as recited in claim 11, wherein the apparatus is configured to operate on a magnetic recording tape having a plurality of servo bands, the servo bands being separated by a distance that is less than the third distance.

14. An apparatus as recited in claim 11, wherein all of the elements in the groups are data readers or data writers.

15. An apparatus as recited in claim 11, wherein the elements are symmetrical about a center line positioned between the second and third groups.

16. An apparatus as recited in claim 11, further comprising:

a drive mechanism for passing a magnetic recording tape over a magnetic head having the groups of elements; and a controller electrically coupled to the elements.

17. An apparatus as recited in claim 16, wherein $W_{EP64}=46.635$ μm±10% and the magnetic head is operated with a 10 degree tilt.

18. An apparatus as recited in claim 16, wherein $W_{SE.Short}=51.690$ μm±10% and the magnetic head is operated with a 10 degree tilt.

19. An apparatus as recited in claim 16, wherein the apparatus is configured to selectively perform 32-channel operation using one of the groups, 64-channel operation using two of the groups, and 128-channel operation using four of the groups.

* * * * *